(12) United States Patent
Diotte et al.

(10) Patent No.: US 6,186,128 B1
(45) Date of Patent: Feb. 13, 2001

(54) APPARATUS FOR TREATMENT OF CRANKCASE EMISSIONS MATERIALS IN A POSITIVE CRANKCASE VENTILATION SYSTEM

(75) Inventors: Ronald A. Diotte, Blue Grass; Charles T. Nachtman; James R. Edwards, both of Dubuque, all of IA (US); Robert L. Gregory, Farmington, AR (US); Frank Winter, San Mateo, CA (US)

(73) Assignee: Gekko International, L.C., Davenport, IA (US)

( * ) Notice: Under 35 U.S.C. 154(b), the term of this patent shall be extended for 0 days.

(21) Appl. No.: 09/310,486

(22) Filed: May 12, 1999

(51) Int. Cl.⁷ .................................................. F02M 25/06
(52) U.S. Cl. ............................................................ 123/572
(58) Field of Search ..................... 123/572, 573, 123/574, 41.86

(56) References Cited

U.S. PATENT DOCUMENTS

| | | |
|---|---|---|
| 1,772,011 | 8/1930 | Malo . |
| 3,072,112 | 1/1963 | Roper . |
| 3,406,669 | 10/1968 | Edwards . |
| 3,878,469 | 4/1975 | Bolasny . |
| 4,069,665 | 1/1978 | Bolasny . |
| 4,073,273 | 2/1978 | McMahon . |
| 4,167,164 | 9/1979 | Bachmann . |
| 4,269,607 | 5/1981 | Walker . |
| 4,355,969 | 10/1982 | Nelson et al. . |
| 4,409,950 | 10/1983 | Goldberg ............................. 123/573 |
| 4,834,028 | 5/1989 | Oetting .............................. 123/41.35 |
| 5,243,946 | 9/1993 | Dalupan .............................. 123/538 |
| 5,243,950 | 9/1993 | Dalupan . |
| 5,450,835 | 9/1995 | Wagner . |
| 5,579,744 | 12/1996 | Trefz . |
| 6,000,383 | * 12/1999 | Diotte et al. ......................... 123/573 |

* cited by examiner

Primary Examiner—Marguerite McMahon
(74) Attorney, Agent, or Firm—Dick and Harris

(57) ABSTRACT

An apparatus for the treatment of gases in a positive crankcase ventilation (PCV) system, in an internal combustion engine, is provided with a housing defining a gas treatment chamber. At least one gas filtering medium is disposed in the treatment chamber, and the gases from the engine crankcase are passed through the gas filtering medium in the treatment chamber, before the gases are routed into the air intake portion of the engine. In addition, the gases, after passage through the gas filtering medium, are passed through an ionization device.

45 Claims, 16 Drawing Sheets

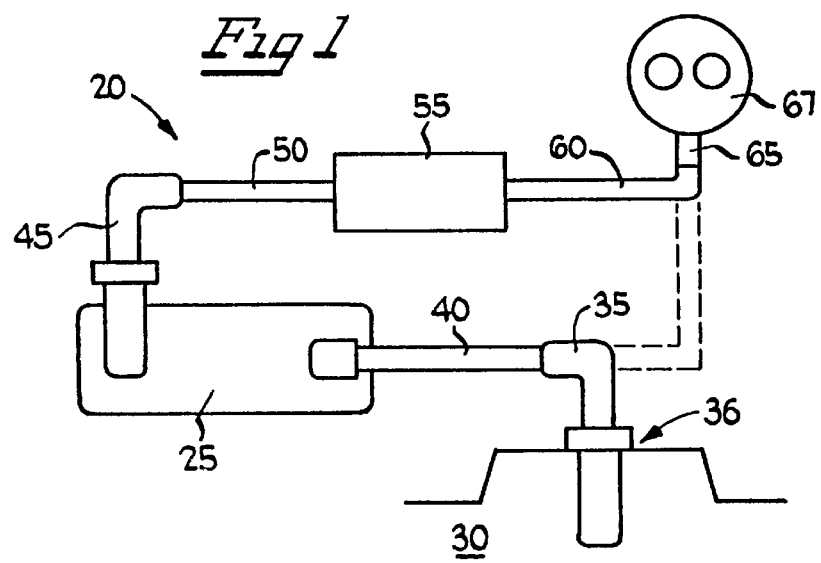
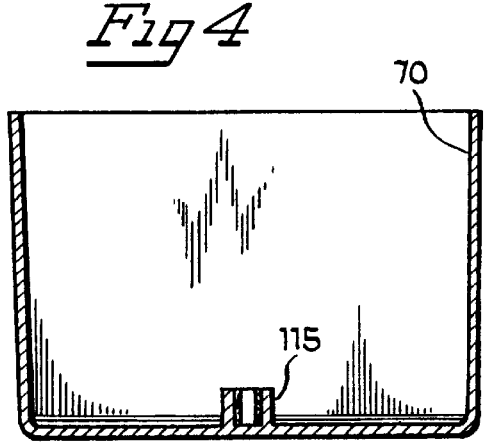
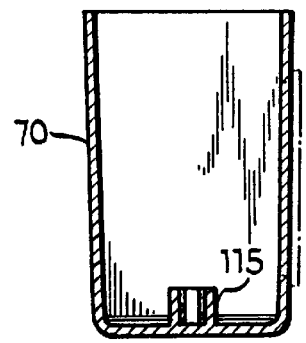
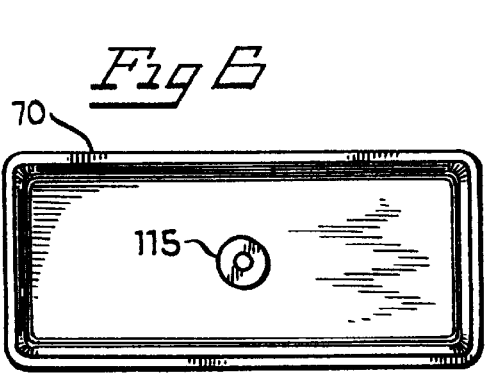
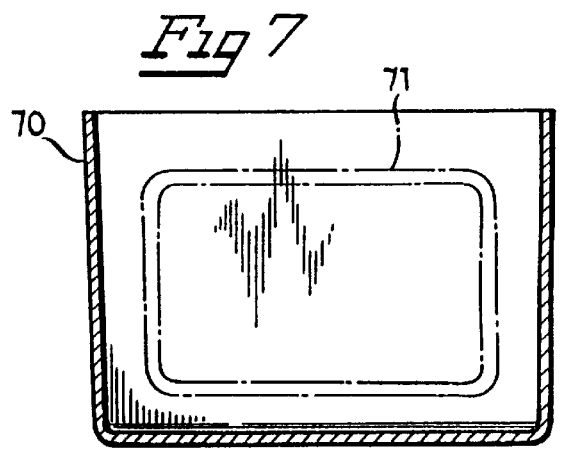

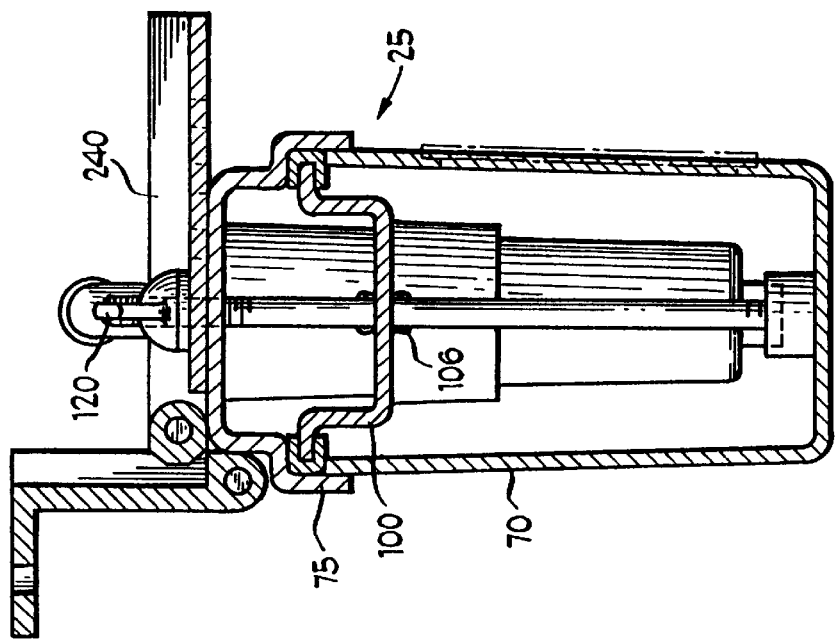
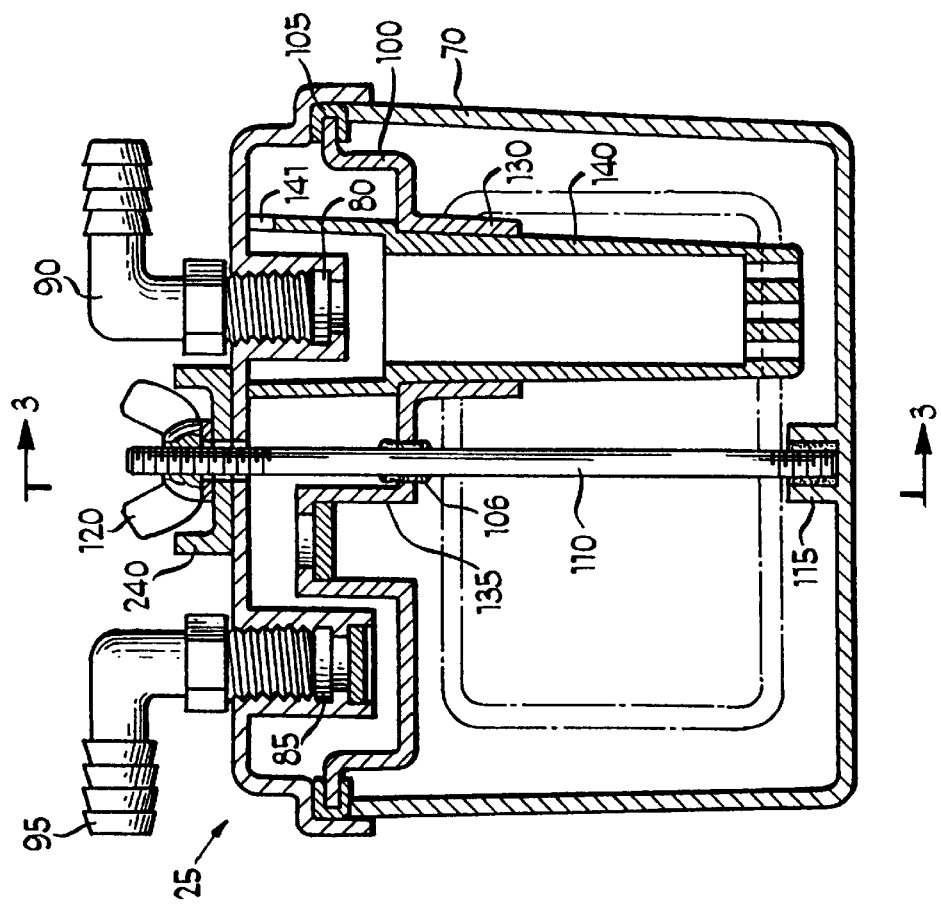

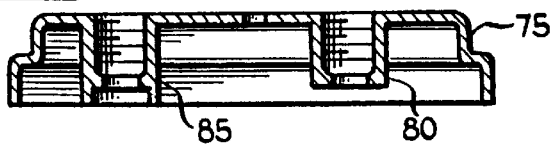
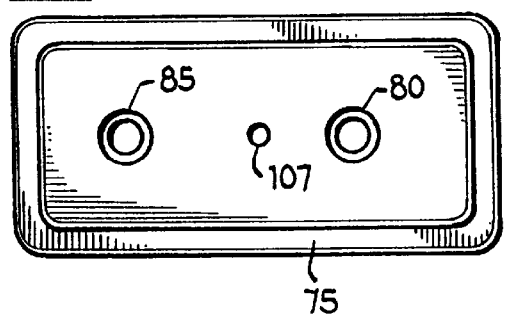
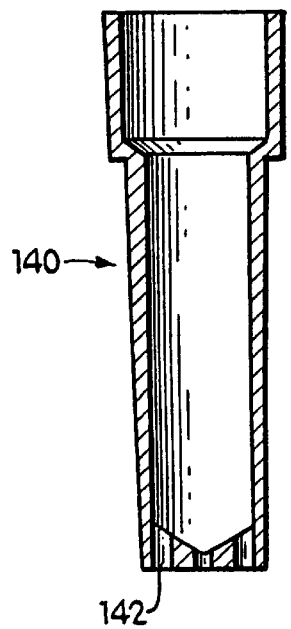
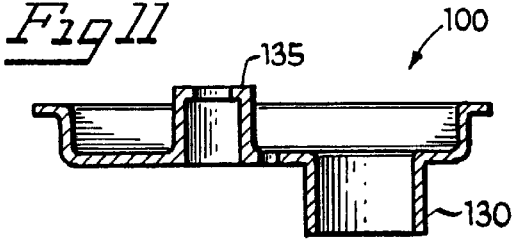
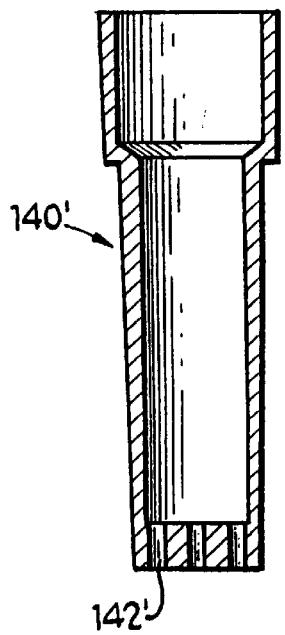
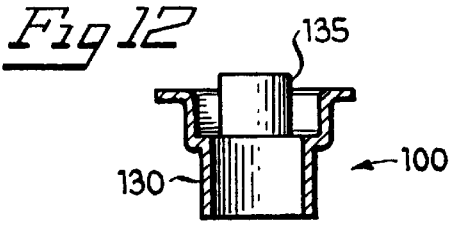
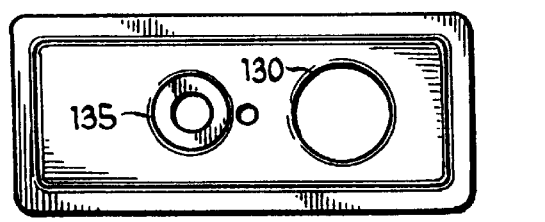

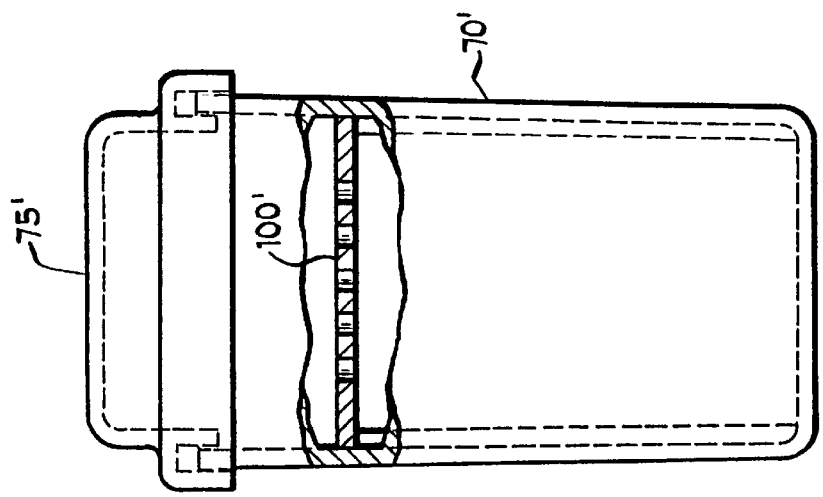
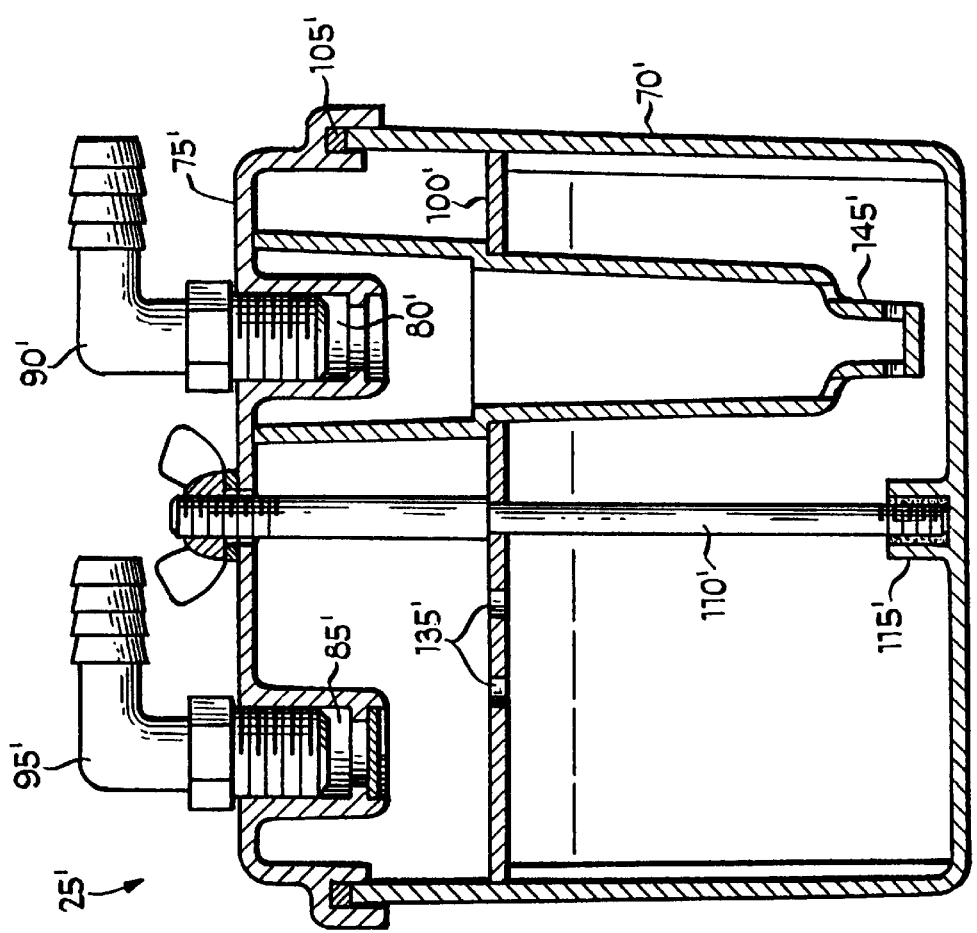

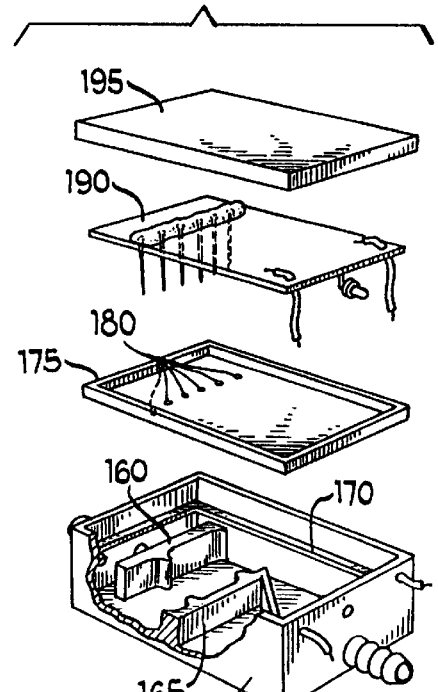
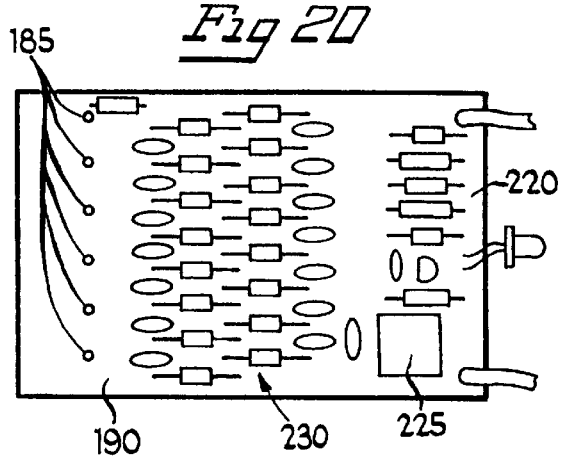
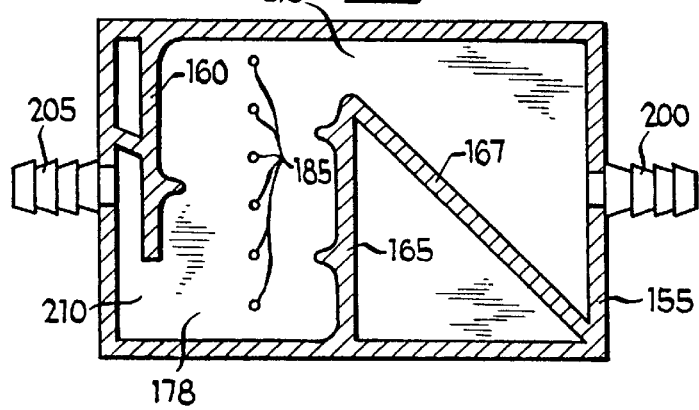
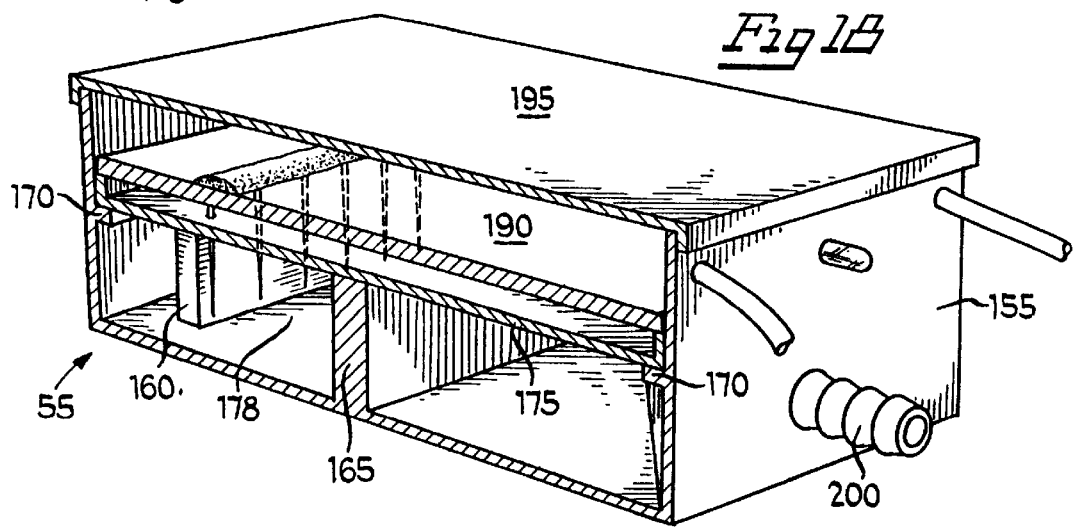

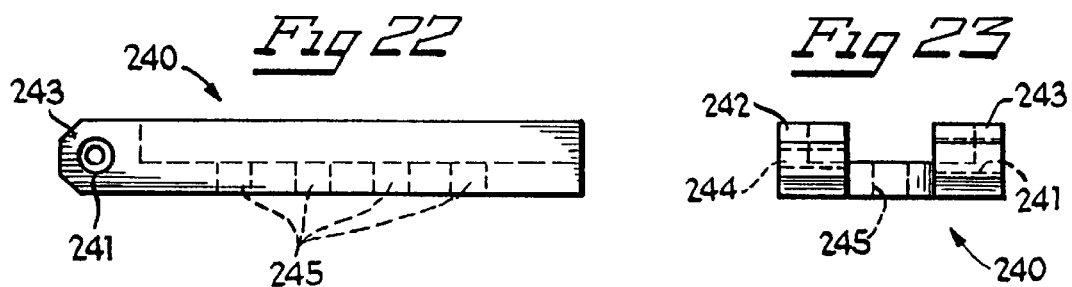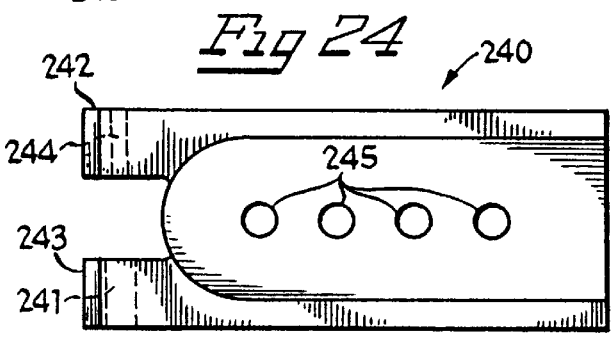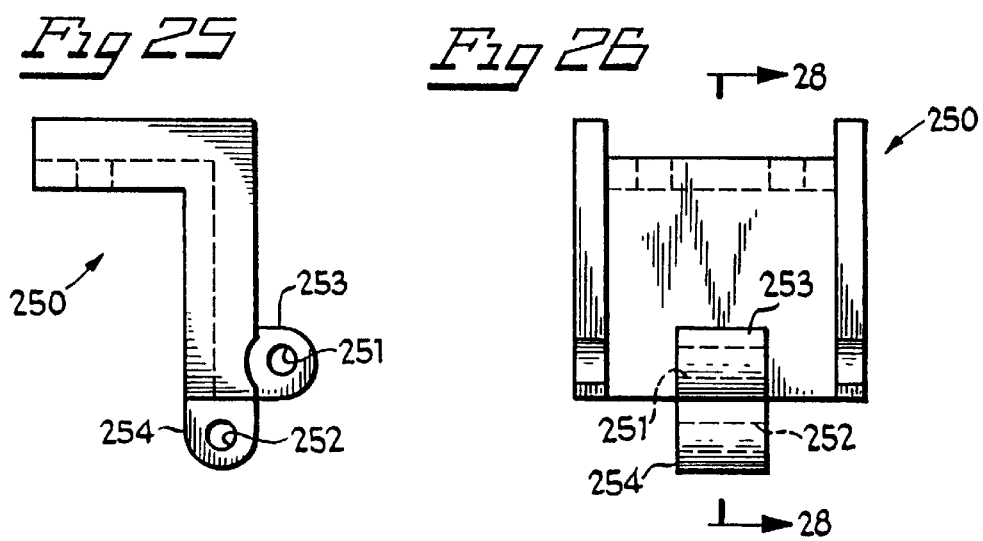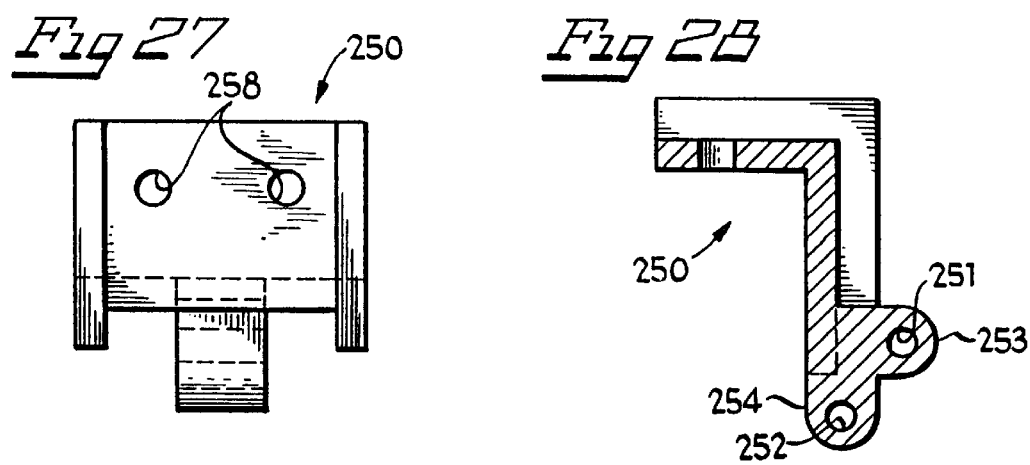

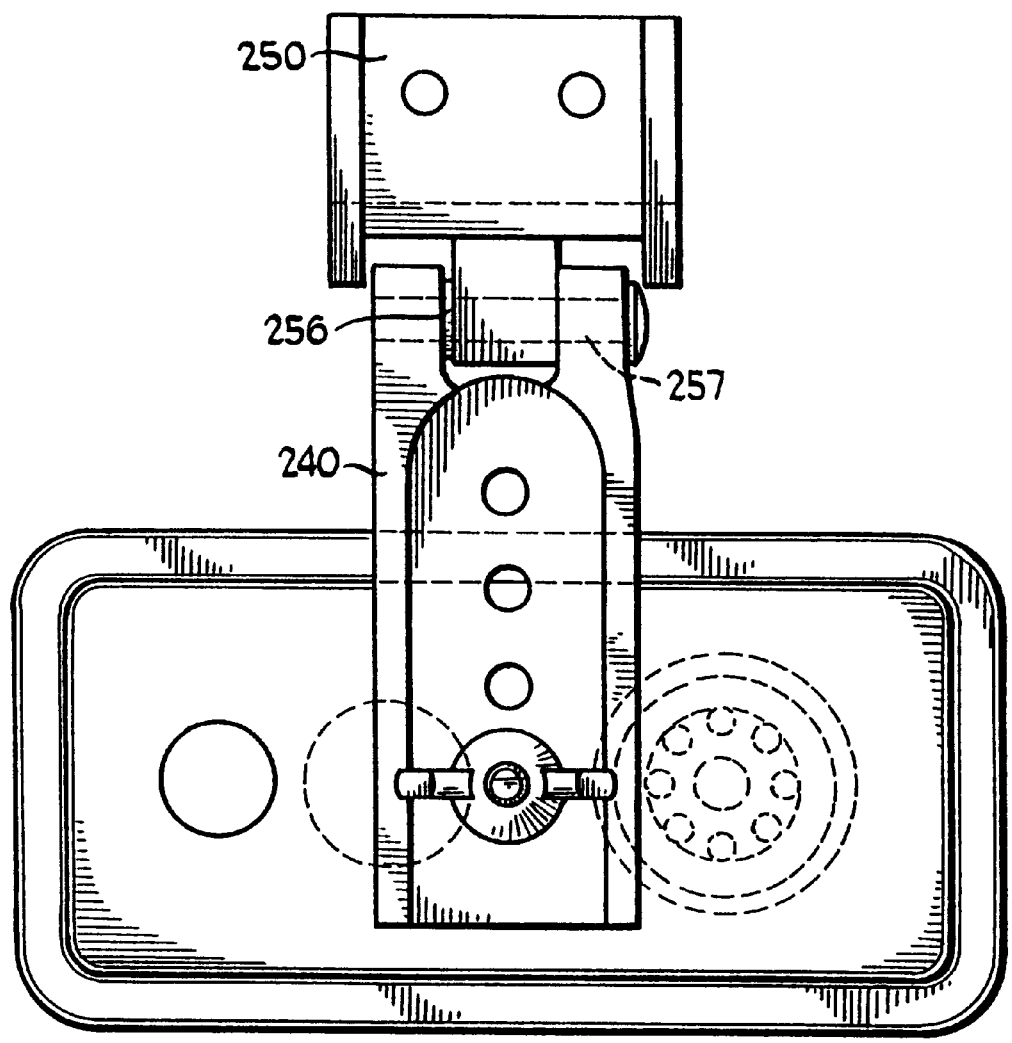

VERTICAL MOUNTING POSITION

OPTIONAL VERTICAL MOUNTING POSITION

HORIZONTAL MOUNTING POSITION

APPARATUS FOR TREATMENT OF CRANKCASE EMISSIONS MATERIALS IN A POSITIVE CRANKCASE VENTILATION SYSTEM

This application claims priority under 35 U.S.C. §120 of the filing date of Nov. 13, 1997 of U.S. patent application Ser. No. 08/968,594, now pending.

BACKGROUND OF THE INVENTION

1. The Field of the Invention

The present invention relates in general to pollution control devices and efficiency devices in internal combustion engines. In particular, the present invention is directed to an apparatus to be installed in the positive crankcase ventilation (PCV) system of an internal combustion engine.

2. Background of the Invention

In internal combustion engines of the type employing reciprocating pistons which drive a crankshaft to deliver torsional power, for example, a common automobile engine, it is well known that a portion of the combustion gases which are formed in the combustion chambers of the cylinders are driven by pressure, as well as the partial suction behind the pistons, past the pistons toward and into the crankcase area of the engine. This phenomenon is known as "blow-by".

Crankcase ventilation gases will contain various amounts of unburned gasoline vapor, raw gasoline, motor oil and motor oil fumes, in addition to combustion gases. These materials may be present in any variety of molecular weights ranging from the lightest fractions of the gasoline to the heaviest fractions of the lubricating oil, including additives. Heavy hydrocarbon sludge may also be present. Combustion byproducts such as carbon dioxide, carbon monoxide, nitrous oxide and water will also be present. Dirt and particulate matter that accumulates in the oil pan of the engine may also be present in the crankcase vent gases in the form of environmental grit and/or ash and carbon from decomposed oil and fuel.

The gases, vapors, liquids and particulate matter being returned to the intake manifold of the engine via a standard PCV system will contain continuously varying amounts of amorphous organic and inorganic compounds. Oils mixed with gasoline will have various degrees of flammability. The more gasoline, the lower the flash point. As more oil is present, the flash point temperature will increase. Oily vapor and oily gasoline entering an engine combustion chamber via the PCV system may retard ignition and reduce efficiency of the engine. Particulate and sludge contaminants will further retard combustion, increasing pollution from the engine, in particular carbon monoxide and hydrocarbon emissions. Fuel economy may also be adversely affected. Particulate matter returned to the engine intake manifold presents additional potential problems which may include: damage to cylinder walls and piston rings that will reduce engine performance and life, increased fuel and moisture passage into the crankcase. In addition, the various materials being ejected from the crankcase through the PCV valve is nonhomogeneous over time, and may lead to the sticking and ultimate premature failure of the PCV valve, requiring replacement more often than would otherwise be necessary.

Prior art devices intended to provide separation of oily and/or particulate materials from internal combustion engine gases, such as crankcase emissions materials, are disclosed in such references as Maio, U.S. Pat. No. 1,772,011; Roper, U.S. Pat. No. 3,072,112; Walker, U.S. Pat. No. 4,269,607; Goldberg, U.S. Pat. No. 4,409,950; Oetting, U.S. Pat. No. 4,834,028; and United Kingdom, 1,572,664. However, such prior art apparatus tend to suffer from a common drawback that such apparatus are typically not configured for practical use within the engine compartment of a vehicle, and are particularly illsuited for use in modern vehicles, in which engine compartment space is at a premium.

Devices are also known which expose internal combustion engine fluids, either prior to or after combustion, to electrostatic fields. Such devices are disclosed in such references as Edwards, U.S. Pat. No. 3,406,669; Bolasny, U.S. Pat. No. 3,878,469; Bolasny, U.S. Pat. No. 4,069,665; McMahon, U.S. Pat. No. 4,073,273; Nelson et al., U.S. Pat. No. 4,355,969; and Dalupan, U.S. Pat. No. 5,243,946.

Dalupan, U.S. Pat. No. 5,243,950, discloses an apparatus for the treatment of gases in a positive crankcase ventilation system, in which gases, emanating from the crankcase are passed through a chamber, through which a filtering medium is circulated. The gases are constrained to pass through the filtering medium, which is water or a water/glycol based mixture. After passage through the filtering medium, the gases are then generally conducted past ion emitting electrodes extending into a portion of the chamber. The chamber and ionizer unit are all configured as a single unit. Although the apparatus of the Dalupan '950 reference may affect removal of some oily and/or particulate materials from crankcase emissions materials, and may impart some ionization effect to the "cleaned" gases, further enhancement of the filtering and ionization effects is possible and desirable. In addition, the configuration and bulk of the apparatus of the Dalupan '950 reference is not conducive to installation in modern vehicle engine compartments.

Accordingly, it would be desirable to provide an improved apparatus for the treatment of internal combustion engine gases, in particular crankcase emissions materials.

It would further be desirable to provide an improved apparatus for the treatment of internal combustion engine gases, in particular, crankcase emissions materials, which employs a liquid filtration system, which has improved resistance to spillage and resistance to siphoning of a liquid filtering medium into the engine.

These and other objects of the invention will become apparent in light of the present specification, including claims, and drawings.

SUMMARY OF THE INVENTION

The present invention comprises, in part, a system for the treatment of crankcase emissions materials, in a positive crankcase ventilation system of an internal combustion engine, in which the crankcase emissions materials, containing at least one of partially and completely unburned hydrocarbon materials, oil, particulate materials and gaseous combustion byproducts, and are drawn from the crankcase of the engine and directed to an air intake portion of the engine for recirculation through and further combustion in the engine.

The system for treatment of crankcase emissions materials in a positive crankcase ventilation system comprises a filtering apparatus, operably configured to receive therethrough crankcase emissions materials conducted substantially directly from the crankcase of an internal combustion engine, for substantially separating removing said at least one of partially and completely unburned hydrocarbon materials, oil, particulate materials and gaseous combustion byproducts from crankcase emissions materials. A positive crankcase ventilation valve is operably positionable downstream from the filtering apparatus, for regulating the pressure of crankcase emissions materials passing through the filtering apparatus. An electronic apparatus is operably positionable downstream from the positive crankcase ventilation valve, for imparting an electrostatic charge to the filtered crankcase emissions materials, prior to delivery of the filtered crankcase emissions materials to the air intake portion of an internal combustion engine.

Preferably, the filtering apparatus comprises a housing, having an inlet and an outlet, with portions of the housing defining a first treatment chamber. The inlet of the housing is connectable, at least indirectly, to a positive crankcase ventilation outlet of an internal combustion engine. The outlet of the housing is connectable, at least indirectly, to a positive crankcase ventilation vacuum port of an internal combustion engine. Liquid filtering medium is disposed in the first treatment chamber for substantially separating oil and particulate material from the crankcase emissions materials. At least one flow directing member is operably configured for constraining introduction of the crankcase emissions materials, from the crankcase, into the liquid filtering medium. At least one porous flow restriction member is operably disposed within the housing, for substantially precluding passage of non-gaseous material from the housing, once the crankcase emissions materials have been introduced into the liquid filtering medium.

Preferably, the housing comprises a lid and a substantially hollow reservoir, operably configured for receiving the liquid filtering medium.

In an embodiment, in which the inlet is disposed in the lid, the flow directing member comprises a tubular member, substantially aligned with the inlet and extending into the substantially hollow reservoir. The at least one porous flow restriction member comprises at least one flow restriction member, operably associated with the lid, for substantially precluding passage of non-gaseous material, downstream from the housing, toward the vacuum port of the internal combustion engine, upon exertion of a suction, of an amount in excess of a predetermined amount, upon the housing from the vacuum port.

Preferably, the lid further comprises a cover member, inlet and outlet openings disposed in the cover member, and an outlet boss, operably aligned with the outlet opening. The outlet boss being operably configured for receipt therein at least one porous flow restriction member. A baffle plate member is substantially sealingly affixable within the cover member, for operably defining therebetween a second treatment chamber, which is substantially segregated from the first treatment chamber when the lid is positioned on the reservoir. An inlet passage is disposed in the baffle plate member, for enabling passage of crankcase emissions materials from the inlet opening into the first treatment chamber. The baffle plate inlet passage is substantially aligned with the inlet opening in the cover member. An intermediate passage is disposed in the baffle plate member, for enabling passage of treated crankcase emissions materials from the first treatment chamber and out of the housing through the outlet opening in the cover member. The intermediate passage is disposed in a substantially nonaligned relationship with the outlet opening of the cover member.

Means may be operably disposed in the first treatment chamber, for facilitating the chemical alteration of at least a portion of the crankcase emissions materials. The means for facilitating chemical alteration of at least a portion of the crankcase emissions materials comprise means for establishing a galvanic cell in the reservoir. The means for establishing a galvanic cell in the reservoir may consist of at least one of the following: members made of dissimilar metals in the galvanic series.

Preferably, the electronic apparatus comprises an electronic ionizer apparatus for imparting a charged particle field to treated crankcase emissions materials exiting from the housing having liquid filtering medium therein, the electronic ionizer apparatus being operably positioned downstream from the housing having liquid filtering medium therein.

The electronic ionizer apparatus preferably comprises a housing, having an inlet and an outlet. Portions of the housing define an electronic treatment chamber, in which the inlet of the ionizer is operably connectable, at least indirectly, to a positive crankcase ventilation outlet of an internal combustion engine. The outlet of the housing is operably connectable, at least indirectly, to a positive crankcase ventilation vacuum port of an internal combustion engine. Electronic circuitry, operably associated with the housing and including at least one emitter pin operably emanating into the electronic treatment chamber, produces ionic emanations for producing a charged particle field within the crankcase emissions materials. The portions of the housing defining the electronic treatment chamber include one or more wall members configured for producing a swirling motion to the crankcase emissions materials entering the electronic treatment chamber from the inlet of the housing, around the at least one emitter pin.

Preferably, the liquid filtering medium consists of a mixture of water and at least one of the following: an antifreezing agent, an alcohol, hydrogen peroxide.

The present invention also comprises, in part, in an alternative embodiment, a system for the treatment of crankcase emissions materials, in a positive crankcase ventilation system of an internal combustion engine, in which the crankcase emissions materials, containing partially and completely unburned hydrocarbon materials, oil, particulate materials and/or gaseous combustion byproducts, are drawn from the crankcase of the engine and directed to an air intake portion of the engine for recirculation through and further combustion in the engine.

The system, in this alternative embodiment, comprises a filtering apparatus, operably configured for containing a liquid filtering medium, and to receive therethrough crankcase emissions materials from the internal combustion engine, for substantially separating removing oily materials and/or particulate materials from the crankcase emissions materials, including a housing operably configured for containing a liquid filtering medium. An inlet receives crankcase emissions materials. Means are provided for directing crankcase emissions materials from the inlet into a liquid filtering medium contained within the housing, toward separating oily and/or particulate materials from gaseous materials in the crankcase emissions materials. An outlet permits escape of filtered crankcase emissions materials from the housing. Means are provided for substantially precluding the escape of liquid filtering medium from the housing. An electronic apparatus is operably positioned downstream from the filtering apparatus for electronically treating the filtered crankcase emissions materials.

The means for substantially precluding the escape of liquid filtering medium from the housing comprise at least one porous barrier member, operably associated with at least one of the inlet and outlet.

In another alternative embodiment of the invention, the system comprises a filtering apparatus, operably configured to receive therethrough crankcase emissions materials from the internal combustion engine, for substantially separating removing oily materials and/or particulate materials from the crankcase emissions materials. An electronic ionizer apparatus, operably positionable downstream from the filtering apparatus, imparts an electrostatic charge to the filtered crankcase emissions materials, prior to delivery of the filtered crankcase emissions materials to the air intake portion of an internal combustion engine. The electronic ionizer apparatus includes a housing, having an inlet and an outlet. Portions of the housing define an electronic treatment chamber. The inlet of the housing is connectable, at least indirectly, to a positive crankcase ventilation outlet of an internal combustion engine. The outlet of the housing is operably connectable, at least indirectly, to a positive crankcase ventilation vacuum port of an internal combustion engine. Electronic circuitry is operably associated with the housing and includes at least one emitter pin operably emanating into the electronic treatment chamber, for producing ionic emanations for producing a charged particle field within the crankcase emissions materials.

The portions of the housing defining the electronic treatment chamber include one or more wall members configured for producing a swirling motion to the crankcase emissions materials entering the electronic treatment chamber from the inlet of the housing, around the at least one emitter pin.

In addition, the invention also comprises, in part, an apparatus for the treatment of crankcase emissions materials, in a positive crankcase ventilation system of an internal combustion engine, in which the crankcase emissions materials, containing partially and completely unburned hydrocarbon materials, oil, particulate materials and/or gaseous combustion byproducts, are drawn from the crankcase of the engine and directed to an air intake portion of the engine for recirculation through and further combustion in the engine.

A housing has an inlet and an outlet. Portions of the housing define a first treatment chamber. As previously stated, the inlet of the housing may be operably connectable, at least indirectly, to a positive crankcase ventilation outlet of an internal combustion engine. Likewise, the outlet of the housing may be operably connectable, at least indirectly, to a positive crankcase ventilation vacuum port of an internal combustion engine. Liquid filtering medium may be disposed in the first treatment chamber, for substantially separating oil and particulate material from the crankcase emissions materials. At least one flow directing member may be operably configured for constraining introduction of the crankcase emissions materials, from the crankcase, into the liquid filtering medium.

At least one porous flow restriction member, as previously mentioned, may be operably disposed within the housing, for substantially precluding passage of non-gaseous material from the housing, once the crankcase emissions materials have been introduced into the liquid filtering medium. The housing includes a lid; and a substantially hollow reservoir, operably configured for receiving the liquid filtering medium. The inlet is disposed in the lid. The flow-directing member preferably may be a tubular member, substantially aligned with the inlet and extending into the substantially hollow reservoir. The at least one porous flow restriction member preferably is a flow restriction member, operably associated with the lid, for substantially precluding passage of non-gaseous material, downstream from the housing, toward the vacuum port of the internal combustion engine, upon exertion of a suction, of an amount in excess of a predetermined amount, upon the housing from the vacuum port. Alternatively, the at least one porous flow restriction member may comprise a flow restriction member, operably associated with the lid, for substantially precluding passage of non-gaseous material, upstream from the housing, toward the crankcase upon exertion of a suction from the crankcase upon the housing.

The lid preferably includes a cover member with an inlet opening and an outlet opening, and an outlet boss, operably aligned with the outlet opening. The outlet boss is operably configured for receipt therein at least one porous flow restriction member. The lid also includes, as mentioned, a baffle plate member, with an inlet passage, and an intermediate passage disposed in the baffle plate member, for enabling passage of treated crankcase emissions materials from the first treatment chamber and out of the housing through the outlet opening in the cover member, the intermediate passage being disposed in a substantially non-aligned relationship with the outlet opening of the cover member.

The means, operably disposed in the first treatment chamber, for facilitating the chemical alteration of at least a portion of the crankcase emissions materials, comprise means for establishing a galvanic cell in the reservoir. The means for establishing a galvanic cell in the reservoir may consist of members made of dissimilar metals in the galvanic series.

In the present invention, the liquid filtering medium preferably consists of a mixture of water and at least one of the following: an antifreezing agent, an alcohol, hydrogen peroxide.

The present invention also comprises, in part, an electronic ionizer apparatus for the treatment of crankcase emissions materials, in a positive crankcase ventilation system of an internal combustion engine, in which the crankcase emissions materials, containing partially and completely unburned hydrocarbon materials, oil, particulate materials and/or gaseous combustion byproducts, and are drawn from the crankcase of the engine and directed to an air intake portion of the engine for recirculation through and further combustion in the engine.

As previously mentioned, the electronic ionizer apparatus for treatment of crankcase emissions materials in a positive crankcase ventilation system may comprise a housing, having an inlet and an outlet. Portions of the housing define an electronic treatment chamber. The inlet of the housing preferably is operably connectable, at least indirectly, to a positive crankcase ventilation outlet of an internal combustion engine. The outlet of the housing likewise is preferably operably connectable, at least indirectly, to a positive crankcase ventilation vacuum port of an internal combustion engine. The electronic ionizer apparatus also includes electronic circuitry, operably associated with the housing and including at least one emitter pin operably emanating into the electronic treatment chamber, for producing ionic emanations for producing a charged particle field within the crankcase emissions materials. The portions of the housing which the electronic treatment chamber, include one or more wall members configured for producing a swirling motion to the crankcase emissions materials entering the electronic treatment chamber from the inlet of the housing, around the at least one emitter pin.

The present invention also comprises, in part, an apparatus for mounting components in an engine compartment of an internal combustion engine-powered vehicle. The mounting apparatus comprises a first bracket member, having a longitudinal axis and one or more attachment apertures therewithin, operably arranged on the first bracket member, in a row, substantially parallel to the longitudinal axis, the first bracket member being operably configured for affixation to an accessory for an internal combustion engine for a vehicle. A second bracket member has a substantially L-shaped configuration. First and second attachment regions are operably configured for attachment thereat, to the first bracket member. The first and second attachment regions are preferably operably arranged so that the first bracket member may be oriented in a range of positions, when attached to the first attachment region, which is substantially perpendicular to range of positions in which the first bracket member may be oriented, when attached to the second attachment region. The second bracket member further has a third attachment region, operably configured for attachment of the second bracket member, to a structure in an engine compartment of a vehicle.

An alternative embodiment of the invention comprises a system for the treatment of crankcase emissions materials, in a positive crankcase ventilation system of an internal combustion engine, in which the crankcase emissions materials, containing at least one of partially and completely unburned hydrocarbon materials, oil, particulate materials and gaseous combustion byproducts, are drawn from the crankcase of the engine and directed to an air intake portion of the engine for recirculation through and further combustion in the engine.

The system comprises a filtering apparatus, for containing a liquid filter medium, the filtering apparatus being operably configured to receive therethrough crankcase emissions materials conducted substantially directly from the crankcase of an internal combustion engine, for substantially separating said at least one of said partially and completely unburned hydrocarbon materials, oil, particulate materials and gaseous combustion byproducts from crankcase emissions materials.

A positive crankcase ventilation valve is operably positioned downstream from the filtering apparatus, for regulating the pressure of crankcase emissions materials passing through the filtering apparatus;

An electronic apparatus is operably positioned downstream from the positive crankcase ventilation valve, for imparting an electrostatic charge to the filtered crankcase emissions materials, prior to delivery of the filtered crankcase emissions materials to the air intake portion of an internal combustion engine.

The filtering apparatus further comprises a housing, having an inlet and an outlet. The inlet of the housing is operably connected, at least indirectly, to a positive crankcase ventilation outlet of an internal combustion engine. The outlet of the filter medium reservoir is operably connected, at least indirectly, to a positive crankcase ventilation vacuum port of an internal combustion engine.

At least one baffle member is operably disposed within the housing, and configured for constraining introduction of the crankcase emissions materials, from the crankcase, into at least one treatment chamber defined by the housing and the at least one baffle member.

The housing preferably comprises, in this alternative embodiment, a substantially hollow reservoir base operably configured for receiving and containing a liquid filter medium; and a reservoir top, including an inner treatment chamber, and a surrounding outer treatment chamber. The reservoir base is preferably an open-topped treatment chamber, defined by a first tubular side wall having an upper rim, and a bottom wall. The inner treatment chamber of the reservoir top is an open-bottomed treatment chamber, defined by a second tubular side wall having a lower rim. The outer treatment chamber is defined by a third tubular side wall surrounding at least a portion of the second tubular side wall, the wall of the outer treatment chamber having a lower rim.

The inlet is disposed in the reservoir top, in fluid communication with the outer treatment chamber thereof, and the outlet is also disposed in the reservoir top, in fluid communication with the inner treatment chamber thereof. Preferably, the at least one baffle member comprises an open-topped tubular member, operably configured, upon positioning within the housing, for defining an inner treatment chamber of the reservoir base, that is in fluid communication with the inner treatment chamber of the reservoir top, and an outer treatment chamber, disposed between a tubular side wall of the tubular member and the first tubular side wall of the reservoir base; the outer treatment chamber being in fluid communication with the outer treatment chamber of the reservoir top. At least one aperture extends through the tubular side wall of the tubular member. The tubular member is further operably configured for cooperation with the reservoir top, so that upon assembly of the housing and at least one baffle member, direct fluid communication between the outer treatment chamber of the reservoir top and the inner treatment chamber of the reservoir top are substantially precluded, so that fluid passing through the housing is constrained to pass, in succession, into the inlet, through the outer treatment chamber of the reservoir top, to the outer treatment chamber of the reservoir base, then to the inner treatment chamber of the reservoir base, then to the inner treatment chamber of the reservoir top and through the outlet, thus passing through liquid filter medium that may be disposed within the reservoir base.

Preferably, the tubular member further comprises a first tubular portion, having an upper rim region and operably configured to be received within the reservoir base, and having a width substantially equal to the width of the lower rim of the wall of the inner treatment chamber of the reservoir top. At least one abutment surface is disposed proximate the upper rim region of the first tubular portion, for engaging the lower rim of the wall of the inner treatment chamber of the reservoir top, when the tubular member is placed in the reservoir base and the reservoir base and reservoir top are assembled, so that the reservoir top forces a lower rim of the first tubular portion of the tubular member against the bottom wall of the reservoir base, to create substantially fluid tight seals between the lower rim of the inner treatment chamber of the reservoir top and the at least one abutment surface, and between the lower rim of the first tubular portion of the tubular member and the bottom wall of the reservoir base.

The at least one aperture in the tubular member is disposed proximate the upper rim region of the first tubular portion. Alternatively, the at least one aperture in the tubular member is disposed proximate the lower rim of the first tubular portion. As a still further alternative, the at least one aperture in the tubular member comprises at least two apertures in the first tubular portion, at least a first of the at least two apertures being disposed proximate the upper rim region of the first tubular portion, and at least a second of the at least two apertures being disposed proximate the lower rim of the first tubular portion.

An alternative embodiment of the invention further comprises means for inhibiting suction of liquid filter medium into the intake system of an internal combustion engine to which the system is connected. The upper rim region of the first tubular portion of the tubular member defines a predetermined height corresponding to a maximum amount of liquid filter medium to be placed in the housing. The means for inhibiting suction of filter medium further comprises a second tubular portion of the tubular member, having a diameter predominantly less than the diameter of the inner treatment chamber of the reservoir top. The second tubular portion of the tubular member emanates from and extending above the first tubular portion of the tubular member, to an elevation higher than the outlet of the inner treatment chamber of the reservoir top, when the housing and at least one baffle member are assembled, so that the housing may be tipped up to a predetermined angle, without having filter medium reach the outlet of the housing.

Means are provided for returning liquid filter medium, that may be carried out of the inner treatment chamber of the reservoir base and subsequently condense in the inner treatment chamber of the reservoir top, to the inner treatment chamber of the reservoir base. The means for returning filter medium preferably comprises a top wall of the inner treatment chamber of the reservoir top, contoured to have a low point disposed above the open top of the tubular member, so that filter medium that may condense on an inner surface of the top wall of the inner treatment chamber will be prompted to collect and drip off from the low point, back into the inner treatment chamber of the reservoir base. The means for returning filter medium may alternatively comprise an aperture in the second tubular portion of the tubular member, for permitting condensed liquid filtering material that may become trapped between the second tubular portion of the tubular member and the wall of the inner treatment chamber of the reservoir top, to flow back into the inner treatment chamber of the reservoir base.

The system may further comprise means, operably disposed in the reservoir base, for facilitating the chemical alteration of at least a portion of the crankcase emissions materials. The means for facilitating chemical alteration of at least a portion of the crankcase emissions materials may comprise means for establishing a galvanic cell in the reservoir base.

The means for establishing a galvanic cell in the reservoir base may comprise at least one material from the group consisting of members made of dissimilar metals in the galvanic series.

The electronic apparatus may comprise an electronic ionizer apparatus for imparting a charged particle field to treated crankcase emissions materials exiting from the housing for a liquid filter medium therein, the electronic ionizer apparatus being operably positioned downstream from the housing for a liquid filter medium therein. The electronic ionizer apparatus may further comprise a housing, having an inlet and an outlet, portions of the housing defining an electronic treatment chamber. The inlet of the housing may be operably connectable, at least indirectly, to a positive crankcase ventilation outlet of an internal combustion engine. The outlet of the housing may be operably connectable, at least indirectly, to a positive crankcase ventilation vacuum port of an internal combustion engine. Electronic circuitry, may be operably associated with the housing and including at least one emitter pin operably emanating into the electronic treatment chamber, for producing ionic emanations for producing a charged particle field within the crankcase emissions materials. The portions of the housing defining the electronic treatment chamber include one or more wall members configured for producing a swirling motion to the crankcase emissions materials entering the electronic treatment chamber from the inlet of the housing, around the at least one emitter pin.

Preferably, in an alternative embodiment of the invention, the cross-sections of each of the first tubular side wall, the second tubular side wall, the third tubular side wall and the tubular side wall of the tubular member have a common configuration selected from the group of shapes consisting of: cylindrical, rectangular, triangular.

The housing may comprise a substantially hollow reservoir operably configured for receiving and containing a liquid filter medium. The at least one baffle member may comprise an open-topped tubular member, disposed within the housing, and defining a generally cylindrical inner treatment chamber and a generally annular outer treatment chamber.

A fluid separator member may be operably disposed between the housing and the at least one baffle member, for partitioning the generally annular outer member into a first annular outer member in direct fluid communication with the inlet to the housing, and a second annular outer member in direct fluid communication with the outlet from the housing.

At least one circumferentially extending baffle wall may emanate upwardly from the at least one baffle member toward a top wall of the housing. At least one circumferentially extending baffle wall may emanate downwardly from a top wall of the housing toward the at least one baffle member.

In another alternative embodiment of the invention, the invention comprises an apparatus for the treatment of crankcase emissions materials, in a positive crankcase ventilation system of an internal combustion engine, in which the crankcase emissions materials, containing at least one of partially and completely unburned hydrocarbon materials, oil, particulate materials and gaseous combustion byproducts, are drawn from the crankcase of the engine and directed to an air intake portion of the engine for recirculation through and further combustion in the engine.

The apparatus for treatment of crankcase emissions materials in a positive crankcase ventilation system may comprise a filtering apparatus, for containing a liquid filter medium, the filtering apparatus being operably configured to receive therethrough crankcase emissions materials conducted substantially directly from the crankcase of an internal combustion engine, for substantially separating removing said at least one of said partially and completely unburned hydrocarbon materials, oil, particulate materials and gaseous combustion byproducts from crankcase emissions materials.

The filtering apparatus may include a housing, having an inlet and an outlet. The inlet of the housing may be operably connected, at least indirectly, to a positive crankcase ventilation outlet of an internal combustion engine. The outlet of the filter medium reservoir may be operably connected, at least indirectly, to a positive crankcase ventilation vacuum port of an internal combustion engine. At least one baffle member may be operably disposed within the housing, and configured for constraining introduction of the crankcase emissions materials, from the crankcase, into at least one treatment chamber defined by the at least one baffle member and the housing.

The housing may further comprise a substantially hollow reservoir base operably configured for receiving and containing a liquid filter medium; and a reservoir top, including an inner treatment chamber, and a surrounding outer treatment chamber.

The reservoir base may be an open-topped treatment chamber, defined by a first tubular side wall having an upper rim, and a bottom wall. The inner treatment chamber of the reservoir top may be an open-bottomed treatment chamber, defined by a second tubular side wall having a lower rim; and the outer treatment chamber may be defined by a third tubular side wall surrounding at least a portion of the substantially tubular wall of the inner treatment chamber, the wall of the outer treatment chamber having a lower rim.

The inlet may be disposed in the reservoir top, in fluid communication with the outer treatment chamber thereof, and the outlet is also disposed in the reservoir top, in fluid communication with the inner treatment chamber thereof. The at least one baffle member may comprise an open-topped tubular member, operably configured, upon positioning within the housing, for defining an inner treatment chamber of the reservoir base, that is in fluid communication with the inner treatment chamber of the reservoir top, and an outer treatment chamber, disposed between a tubular side wall of the tubular member and the first tubular side wall of the reservoir base; the outer treatment chamber being in fluid communication with the outer treatment chamber of the reservoir top. At least one aperture may extend through the tubular side wall of the tubular member. The tubular member may be further operably configured for cooperation with the reservoir top, so that upon assembly of the housing and at least one baffle member, direct fluid communication between the outer treatment chamber of the reservoir top and the inner treatment chamber of the reservoir top are substantially precluded, so that fluid passing through the housing is constrained to pass, in succession, into the inlet, through the outer treatment chamber of the reservoir top, to the outer treatment chamber of the reservoir base, then to the inner treatment chamber of the reservoir base, then to the inner treatment chamber of the reservoir top and through the outlet, thus passing through liquid filter medium that may be disposed within the reservoir base.

The tubular member may further comprise a first tubular portion, having an upper rim region and operably configured to be received within the reservoir base, and having a width substantially equal to the width of the lower rim of the wall of the inner treatment chamber of the reservoir top. At least one abutment surface, disposed proximate an upper rim region of the first tubular portion, for engaging the lower rim of the wall of the inner treatment chamber of the reservoir top, when the tubular member is placed in the reservoir base and the reservoir base and reservoir top are assembled, so that the reservoir top forces a lower rim of the first tubular portion of the tubular member against the bottom wall of the reservoir base, to create substantially fluid tight seals between the lower rim of the inner treatment chamber of the reservoir top and the at least one abutment surface, and between the lower rim of the first tubular portion of the tubular member and the bottom wall of the reservoir base.

The at least one aperture in the tubular member may be disposed proximate the upper rim region of the first tubular portion. The at least one aperture in the tubular member may be disposed proximate the lower rim of the first tubular portion. The at least one aperture in the tubular member may comprise at least two apertures in the first tubular portion, at least a first of the at least two apertures being disposed proximate the upper rim region of the first tubular portion, and at least a second of the at least two apertures being disposed proximate the lower rim of the first tubular region.

Means may be provided for inhibiting suction of liquid filter medium into the intake system of an internal combustion engine to which the system is connected. The upper rim region of the first tubular portion of the tubular member may define a predetermined height corresponding to a maximum amount of liquid filter medium to be placed in the housing. The means for inhibiting suction of filter medium may further comprise a second tubular portion of the tubular member, having a width predominantly less than the width of the inner treatment chamber of the reservoir top. The second tubular portion of the tubular member may emanate from and extending above the first tubular portion of the tubular member, to an elevation higher than the outlet of the inner treatment chamber of the reservoir top, when the housing and at least one baffle member are assembled, so that the housing may be tipped up to a predetermined angle, without having filter medium reach the outlet of the housing.

Means may be provided for returning liquid filter medium, that may be carried out of the inner treatment chamber of the reservoir base and subsequently condense in the inner treatment chamber of the reservoir top, to the inner treatment chamber of the reservoir base. The means for returning filter medium may further comprise a top wall of the inner treatment chamber of the reservoir top, contoured to have a low point disposed above the open top of the tubular member, so that filter medium that may condense on an inner surface of the top wall of the inner treatment chamber will be prompted to collect and drip off from the low point, back into the inner treatment chamber of the reservoir base. The means for returning filter medium may further comprise an aperture in the second tubular portion of the tubular member, for permitting condensed liquid filtering material that may become trapped between the second tubular portion of the tubular member and the wall of the inner treatment chamber of the reservoir top, to flow back into the inner treatment chamber of the reservoir base.

Preferably, the cross-sections of each of the first tubular side wall, the second tubular side wall, the third tubular side wall and the tubular side wall of the tubular member have a common configuration selected from the group of shapes consisting of: cylindrical, rectangular, triangular. The housing may comprise a substantially hollow reservoir operably configured for receiving and containing a liquid filter medium. The at least one baffle member may comprise an open-topped tubular member, disposed within the housing, and defining a generally cylindrical inner treatment chamber and a generally annular outer treatment chamber.

The apparatus may further comprise a fluid separator member, operably disposed between the housing and the at least one baffle member, for partitioning the generally annular outer member into a first annular outer member in direct fluid communication with the inlet to the housing, and a second annular outer member in direct fluid communication with the outlet from the housing. At least one circumferentially extending baffle wall may emanate upwardly from the at least one baffle member toward a top wall of the housing. At least one circumferentially extending baffle wall may emanate downwardly from a top wall of the housing toward the at least one baffle member.

BRIEF DESCRIPTION OF THE DRAWINGS

FIG. 1 is a schematic illustration of the apparatus for the treatment of gases in a positive crankcase ventilation system, according to a preferred embodiment of the present invention.

FIG. 2 is a side elevation, in section, of the emissions control device of the apparatus for the treatment of gases, according to an embodiment of the present invention.

FIG. 3 is an end elevation, in section, of the emissions control device of the apparatus for the treatment of gases, according to the embodiment of FIG. 2.

FIG. 4 is a side elevation, in section, of the reservoir of the emissions control device of FIGS. 2 and 3.

FIG. 5 is an end elevation, in section, of the reservoir of the emissions control device of FIGS. 2 and 3.

FIG. 6 is a top plan view of the reservoir of the emissions control device of FIGS. 2 and 3.

FIG. 7 is a side elevation of the reservoir of the emissions control device of FIGS. 2 and 3, showing the optional observation window.

FIG. 8 is a side elevation, in section, of the lid for the emissions control device of FIGS. 2 and 3.

FIG. 9 is an end elevation, in section, of the lid for the emissions control device of FIGS. 2 and 3.

FIG. 10 is a top plan view of the lid for the emissions control device of FIGS. 2 and 3.

FIG. 11 is a side elevation, in section, in an inverted position, of the baffle plate for the emissions control device of FIGS. 2 and 3.

FIG. 12 is an end elevation, in section, in an inverted position, of the baffle plate for the emissions control device of FIGS. 2 and 3.

FIG. 13 is a top plan view of the baffle plate for the emissions control device of FIGS. 2 and 3.

FIG. 14A is a side elevation, in section, of the interior inlet tube for the emissions control device of FIGS. 2 and 3.

FIG. 14B is a side elevation, in section, of an interior inlet tube of an alternative embodiment, for the emissions control device of FIGS. 2 and 3.

FIG. 15 is a side elevation, in section, of the emissions control device according to an alternative embodiment of the invention.

FIG. 16 is an end elevation, in section, of the emissions control device according to the alternative embodiment of the invention of FIG. 15.

FIG. 17 is an exploded perspective view of the components for the electronic ionizer for the apparatus according to a preferred embodiment of the invention.

FIG. 18 is a perspective view, partially in section, of the electronic ionizer of the embodiment of FIG. 17.

FIG. 19 is a top plan view, in section, of the electronic ionizer of FIG. 17, showing the gas maze through the ionizer electrodes.

FIG. 20 is a schematic showing how the circuit board for the electronic ionizer of FIG. 17 may be laid out.

FIG. 22 is a side elevation of a portion of the mounting bracket for the liquid filtering device.

FIG. 23 is an end elevation thereof.

FIG. 24 is a top plan view thereof.

FIG. 25 is a side elevation of the angle bracket member for the mounting bracket for the liquid filtering device.

FIG. 26 is an end elevation thereof.

FIG. 27 is a top plan view thereof.

FIG. 28 is a side elevation, in section, thereof.

FIG. 29 is a top plan view of the mounting bracket affixed to the liquid filtering device.

DETAILED DESCRIPTION OF THE INVENTION

Figure 21:
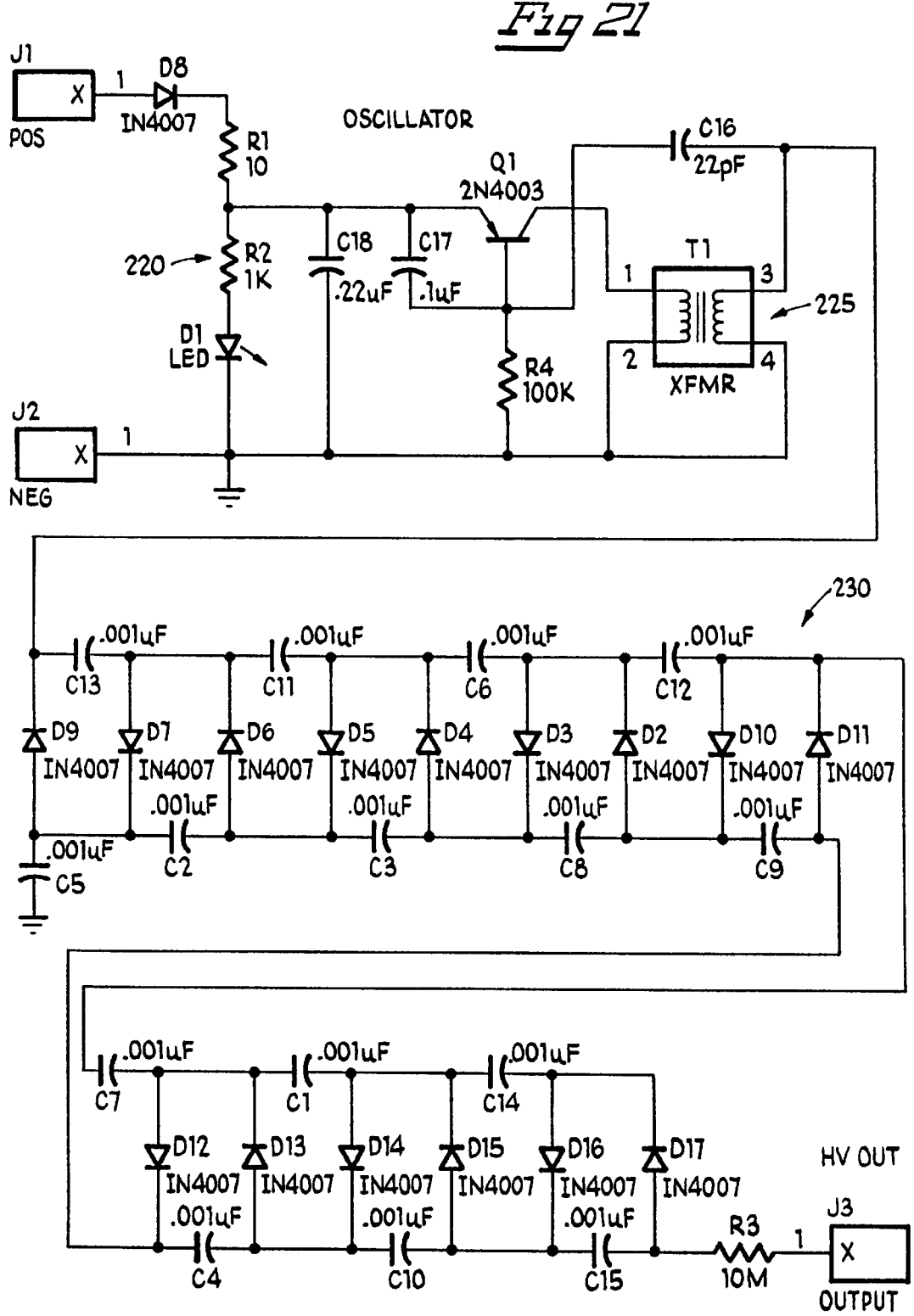
FIG. 21 is a circuit diagram for a transistor oscillator for the electronic ionizer of FIG. 17.

While this invention is susceptible of embodiment in many different forms, there are shown in the drawings and will be described in detail herein, several specific embodiments, with the understanding that the present invention is to be considered as an exemplification of the principles of the invention and is not intended to limit to the invention to the embodiments illustrated.

FIG. 1 is a schematic illustration of the apparatus 20 for the treatment of gases in a positive crankcase ventilation system, according to a preferred embodiment of the invention. Apparatus 20 is configured to be retrofitted into existing internal combustion engine systems, although it may be suitably modified for inclusion as original equipment, without departing from the scope of the present invention. Apparatus 20 includes emission control device 25, connected to engine 30 by hose adapter 35 and hose 40. Hose adapter 35 is configured to be insertingly received into the engine 30 at the original PCV valve location 36. The original PCV valve 45 for engine 30 is connected, by a suitably sized hose, for example, to the outlet of emission control device 25 and by hose 50 to electronic device 55, which is an electronic ionizer, through which the "cleaned" gases are passed. Electronic device 55 is, in turn, connected by hose 60 to the PCV vacuum port 65 at the intake manifold/carburetor 67 of the internal combustion engine. In the absence of the system of the present invention, the conventional route of the crankcase emissions materials is directly from the PCV port on the engine, to the vacuum port, as indicated by the broken line in FIG. 1.

FIGS. 2–14A, 14B illustrate the emissions control device 25. Reservoir 70 and lid 75 form a tank for holding a liquid filtering medium. Cylindrical inlet 80 and outlet 85 are formed in lid 75. Inlet fitting 90 is preferably threadably received in inlet 80, while outlet fitting 95 is preferably threadably received in outlet 85. Baffle plate 100, which has a gasket member 105 affixed to its peripheral edge, is insertably and frictionally received in lid 75. It is important that gasket member 105 make a substantially air- and liquid-tight seal between lid 75 and baffle plate 100, in order to facilitate the drawing of crankcase emissions materials through the device 25 and on through the remainder of the treatment system. In addition, the seal is needed to help prevent loss of the filtering solution through spillage and seeking which might be prompted, for example, by vibration of the engine. Preferably, gasket 105 is fabricated from a fluoropolymer with a hardness of 40–50 on a durometer test. Fastener rod 110 is preferably threadably or otherwise fixedly received at its lower end in a boss 115 in reservoir 70. The upper end of fastener rod 110 passes through aligned holes in baffle plate 100 and lid 75, and is threaded, to receive a fastener, such as wing nut 120. In order to ensure that a suitably tight seal is created, the wing nut 120 may be tightened snugly by hand.

Preferably, reservoir 70, lid 75, and baffle plate 100 are all fabricated from a durable plastic material, which will be capable of withstanding the heat and vibration associated with a car engine compartment environment. In addition, the material from which reservoir 70, lid 75, and baffle plate 100 are fabricated should be capable of resisting attack by the crankcase emissions materials which will be passed through it, as well as attack by the chemicals in the solution which will be stored in it, as described in further detail herein.

FIGS. 5–7 illustrate reservoir 25 in further detail. In a preferred embodiment of the invention, reservoir 70 is fabricated from a substantially opaque material. A window 71, shown in broken lines, may be provided to permit visual inspection of the level of liquid solution in the emissions control device 25. Alternatively, reservoir 70 may be fabricated from a transparent or translucent material, to enable visual inspection of the liquid solution to be contained therein. Regardless of its configuration, the reservoir should be resistant to chemical or physical deterioration in its given environment.

The structure of lid 75 and baffle plate 100 is configured to force crankcase emissions materials, received through inlet 90, through the liquid solution held in emissions control device 25. Reservoir 70 preferably will be filled with a liquid solution to a level range substantially flush with the lower end of the open tubular boss 130 in baffle plate 100. The inside surface of reservoir 70 may carry indicia corresponding to the numerical value of the volume of liquid solution in the reservoir. If reservoir 70 should happen to be fabricated from transparent or translucent material, or have a transparent or translucent window, indicia may placed on the outside surface of the reservoir.

FIGS. 8–10 illustrate the lid 75, which includes inlet 80 and outlet 85. Preferably, a polymer filter may be insertably received within outlet 85. Alternatively, an atomizer disc may be provided on the lower end of outlet 85, to prevent the mass passage of liquid solution out through the outlet 85, which might otherwise occur as a result of the suction placed on the emissions control device 25 by the vacuum from the vacuum port.

FIGS. 11–13 illustrate the baffle plate 100. Baffle plate 100, which is shown upside down in FIGS. 11 and 12, includes peripheral edge 125, inlet boss 130 and intermediate boss 135. Inlet boss 130 insertably receives interior inlet tube 140 (FIG. 14A), which preferably is also configured from a plastic or similar material. Intermediate boss 135 is preferably configured to receive a polymer filter for precluding passage of liquid solution or large droplets thereof, and to restrict passage of mist or vapor. Alternatively, an atomizer disc may be positioned at an end of intermediate boss 135.

In a preferred embodiment of the invention, in order to further ensure that the flow of gases is properly directed and that there are no leaks, in addition to the gasket 105, an elastomeric grommet 106 is provided, in the aperture 107 in baffle plate 100. Grommet 106 is toroidal, so that fastener rod 10 passes through grommet 106.

When the emissions control device is installed to an internal combustion engine, it is important that the emissions control device be installed between the crankcase of the engine and the PCV valve. Relocation of the PCV valve downstream of the emissions control device prevents rapid or uncontrolled evacuation or loss of the solution that may be present in the tank for holding a liquid filtering medium, due to increased vacuum. In addition, retaining the PCV valve prevents increased reduction of the boiling point of the solution due to the less relative loss of pressure (higher vacuum) controlled by the PCV valve. Other physical characteristics of the solution and PCV pollutants, such as vapor pressure and condensation may also be affected by higher relative vacuum. By locating the reservoir upstream of the PCV valve, vacuum is limited to that controlled by the original equipment valve.

A universal type plastic connector will be used for installation of the emissions control device 25 in the original PCV location. The connector may be of a hose barb type (similar to the connection ends of the inlet and outlet fittings shown in FIG. 3) to allow automotive tubing or hose to be attached to provide the gaseous connection required between the original PCV location and the emissions control device. The inlet fitting 90 to the emissions control device 25 is also a hose barb type connection, preferably a right angle, that allows automotive hose to be used for gaseous communication of crankcase emissions with the device 25. This hose barb connection is screwed into the lid 75. The inlet fitting 90 and lid 75 are in communication with interior inlet tube 140, which provides a number of functions for the device 25.

The functions of interior inlet tube 140 include:
1) provision of gaseous communication of crankcase emissions with the solution to be contained in device 25 and other materials which may be placed within the device 25;
2) provision of pressure relief and gas by-pass to control aeration of the solution in the device 25, to control solution loss and eliminate any hydraulic back pressure to the crankcase during engine start-up and operation;
3) provision of fail safe forward motion of crankcase emissions in case of freezing or other blockage in the device 25 due to poor maintenance, neglect or damage;
4) provision of back-flow prevention to eliminate the possibility of the solution, etc. to be drawn back into the crankcase due to dieseling, back-fire or other condition that could cause a reversal of gas flow.

The interior inlet tube 140 is located toward one end of the interior of device 25. This allows the solution to mix in a circular motion during the aeration process. This also allows fluid movement over catalytic materials which may be located in the device 25, and also provides continuous mixing of the solution with crankcase emissions.

Crankcase emissions materials are diverted 90° from the direction of travel at the elbow of the inlet fitting 90. This provides the first inertial break for particulate matter and/or oil/fuel droplets traveling in the gas hose. These materials will hit the elbow wall causing rapid deceleration of the solid/liquid material. Crankcase emissions materials will then travel downward into the interior inlet tube 140 which extends below the level of the liquid solution, to a position near the bottom of the device 25. The solid and liquid material contained in the crankcase emissions materials then hit the liquid and the bottom of the device in a direction 180° from the outlet of the device 25 and become trapped in the device 25.

The interior inlet tube 140 is vented (141) into the device 25 near the top tangent to the vertical flow direction. This vent is located above the solution level and baffle plate 100 to provide the pressure relief, aeration control and back-flow prevention described above. That is, if the solution were to freeze, the suction from the intake of the engine would still be able to pull some of the crankcase gases through the apparatus, bypassing the frozen solution. In addition, since it is known that the direction of the vacuum can, during the engine cycle, reverse (although the magnitude of the reversed suction is not as great as the magnitude of the normal suction flow) the vent 142 prevents the crankcase from exerting sufficient suction to draw gases and/or filtering solution into the crankcase.

The preferred horizontal gas flow through the vent is 360° from the flow direction in the PCV hose or 180° from the elbow particle impact area. This vent is sized to maximize gaseous communication of the reservoir solution without physical loss of the solution downstream. The interior inlet tube 140 further contains openings 142 at the bottom of the tube to provide direct crankcase gas, vapor, particle, etc., contact with the solution. The number and size of the openings may vary and are may be distributed around the tube. Radially directed openings may also be provided near the bottom of tube 140, and may also be provided at several levels above the bottom of the tube. The interior of the end of tube 140 may be conical (such as may be formed by machining the interior opening of tube 140 from a solid piece of material. Alternatively, the interior of the end of the tube (e.g., tube 140') may be substantially flat, as seen in FIG. 14B.

The preferred solution to be used in device 25 will comprise a mixture of uninhibited food grade or USP grade 1,2-dihydroxypropane and water. The dihydroxypropane (propylene glycol) is a type of anti-freeze. The freeze point of this material is on the order of −76° F., depending upon the mixture to provide freeze protection in cold climates. A trace amount of methyl, ethyl, isopropyl, butyl or other alcohol may be added to the solution to improve the solubility of the fuel, oil, sludge and vapors with the solution. Ethyl and isopropyl are preferred due to the solubility of these alcohols with gasoline and water. Ethyl alcohol is used to make gasohol blended gasoline fuel. Isopropyl alcohol is used in gas line antifreeze and will not cloud, like methanol.

Uninhibited food or USP grade propylene glycol is used due to low toxicity, environmental compatibility (before mixing with oil, sludge and other contaminants) and lack of dye, color and antioxidants. The USP grade is preferred due to reagent purity.

The water mixed with the glycol will be purified water with a minimum specific resistance of 100,00 ohm-centimeter at 25° C. for the system of the present invention. Purified water at 100,000 ohm-centimeter is consistent with water having less than 5.0 ppm total ionized solids. This water may be prepared by reverse osmosis, distillation, deionization or a combination of all three methods, and should contain less than 10.0 ppm silica as $SiO_3$. Water with an ionic content greater than 5.0 ppm may interfere with the electronic ionizer located downstream of the chamber, particularly if divalent cations are present in the water.

The mixing action of the fuel, oil, sludge, etc., and glycol is based on the chemical principle that like materials dissolve like materials. For example, motor oil is soluble in gasoline, gasoline is soluble in alcohol and glycol, and alcohol and glycol are soluble in water. The results of mixing the above-listed components is an emulsion of oily fuel, glycol/alcohol and water. This emulsion contains a large amount of minute oily droplets of oily fuel that remain separated into small droplets even after aeration or agitation has stopped. This effect is similar to that caused by the use of soap or detergent on such materials, but does not produce foam or lather in the process. The creation of the emulsion results in an exponential increase in the surface area contact between the oily fuel and glycol that greatly increases the oxidation potential (breakdown) of the oil. The fractions that completely mix will have a reduced flash point. Any fraction that does not completely dissolve will also burn easier due to the size of the suspended particles (droplets) and the fact that the undissolved fractions are surrounded by more flammable material. Glycol vapors and mist are combustible. Oily fuel and glycol vapors/mist mixed together are also combustible. The water present serves to retard the system and, in combination with the glycol, helps to limit evaporation. All of the foregoing materials in the solution are environmentally safe and non-toxic, prior to contact with the engine emissions.

During operation of the device 25, the oily fuel droplets are atomized as an aerosol with the glycol/water vapors. This provides a vapor or mist from the device 25 that has a substantially reduced flash point as compared to direct oil/gasoline mixtures, particles and sludge from a standard PCV system. In other words, by dispersing the heavy oils and gasoline into the solution and dissolving some of the hydrocarbon and gases into the solution, combustion is easier to achieve by passive control. The fumes, vapors and mist exiting the device 25 have a lower and more consistent flash point range. Without the device 25, the concentrations of oil and gasoline reaching the combustion chamber are substantially uncontrollable. Heavy high flash point oils may reach the combustion chamber intermittently with lower flash point fuel and gases, which may interrupt even combustion.

The glycol contains 42% oxygen by weight. Ethyl alcohol contains 35% oxygen by weight. Carbon monoxide and carbon dioxide will be absorbed into the solution at a rate that is equivalent to the partial pressure for each compound. This absorption will be limited by the pressure or lack of pressure available within device 25. Carbon dioxide disassociates in water solutions to form carbonic acid. This further increases the amount of oxygen in the solution. Nitrous oxides are sparingly soluble in water and alcohols. However, oxides of nitrogen will support combustion via the oxygen content of the compound. By increasing the amount of available oxygen in the solution, the potential for efficient combustion is increased. Furthermore, by maintaining a higher level of oxygen for combustion, to a point, further production of oxides of nitrogen are limited. Oxidation of the hydrocarbons (oily fuel) in the gases will also begin in the solution prior to combustion.

Reagent grade hydrogen peroxide, ACS grade of variable strength, but no greater a strength or concentration than about 8% by weight, may also be added to the solution as part or all of the water fraction. 3% by weight is preferred. Peroxide added to the solution will provide a strong oxidizing agent that will assist in the breakdown of organic compounds in the solution. Peroxide in greater strength will decompose the glycol and other organic material too quickly. The peroxide will also increase the oxygen content in the solution.

A preferred formulation of the liquid filtering solution could be as follows:

- 37% by volume water (deionized and purified as described hereinabove),
- 55% by volume propylene glycol,
- 5% by volume ethyl and/or isopropyl alcohol, and
- 3% by volume hydrogen peroxide solution (3% by wt.), although the constituencies and proportions of the liquid filtering solution may be varied as required by the particular application and/or availability of materials.

Catalytic materials may also be placed in the solution to assist with the breakdown of crankcase organic materials. These catalytic materials may include dissimilar metals that will create a galvanic cell when exposed to water. The galvanic cell function (corrosion) will generate hydroxyl free radicals in the solution. In doing so, depending on the types of metals used, multivalent metal cations may also be released into the solution. In too high a quantity, the multivalent cations may interfere with the ionization electrodes downstream. Therefore, the dissimilar metals used for the galvanic cell should be relatively close together in the galvanic series to limit the rate of corrosion.

An example of dissimilar metals in this solution that would be less desirable, though functional, would be copper and aluminum. An example that would be more desirable would be a zinc-copper pairing. The preferred material(s) would consist of dissimilar metals that are located closer together in the galvanic series. This would create a much lower and slower oxidation/reduction potential in the device 25 and provide better control of the system. Aluminum and copper are quite far apart in the galvanic series and under certain conditions may self-destruct rapidly. Metals such as tin and naval brass would provide a suitable, less active, galvanic cell.

There are metal alloys available, such as KDF 55 Process Medium and KDF wool that will provide the oxidation/reduction potential required to assist in the breakdown of organic crankcase emissions materials. This material is made of zinc and copper in ratios that provide efficient oxidation/reduction potential when contacted with water. This material is typically used in water purification, and the mechanisms for breaking down organic materials in the crankcase emissions materials are similar. Strontium and barium ferrite, magnetic or non-magnetic, will also produce hydroxyl radicals in solution.

The purpose of the catalytic materials is to produce hydroxyl free radicals (OH—) in solution. Hydroxyl radicals are efficient at breaking down organic compounds in aqueous solutions. The ability of hydroxyl free radicals to destroy organic compounds is known. The ultimate byproducts of the destruction of light organic materials by hydroxyl free radicals are carbon dioxide and water. However, the heavy oils which may be present in crankcase emissions materials will be broken down into smaller, lower flash point molecular weight compounds during the oxidation/reduction process. This will produce lower molecular weight intermediate organic compounds in the reservoir, which have lower flash points. Even when the engine is shut off, these chemical reactions will continue to take place in device 25.

As a practical matter, because the crankcase gas velocities are high, and the residence time in the device 25 is short, complete breakdown/conversion of the organic materials in the crankcase emissions materials by device 25 is a practical impossibility, for any device sized to be usable in a consumer vehicle. However, using commercially justifiable materials, device 25 can and will provide marked improvement in the quality of the crankcase emissions materials.

Materials to be used for the solution should be chosen to provide suitable gas treatment characteristics, but still be reasonable economical. For example, the propylene glycol based antifreeze sold under the brand name SIERRA® could be used as a solution base. Pieces of copper, brass or bronze metal could be used as catalytic materials. Copper oxides formed by any copper containing materials can be used to assist in the destruction of oxides of nitrogen. Gold and platinum materials can be used, if economically justified.

Once the crankcase emissions have entered the device 25 and solution, essentially all the heavy hydrocarbon and particulate matter will be trapped in the device 25. Thus, only the lighter hydrocarbons and gases will be able to escape device 25 to proceed to the intake manifold. The lighter hydrocarbons should consist mainly of a lower flash point mixture of hydrocarbon vapor, mists and gases. This provides control of the crankcase emissions at a level more suitable for combustion, thus reducing emissions and increasing fuel economy.

The baffle plate 100 in device 25 ensures prevention of direct aspiration of the solution, when the vehicle travels on rough surfaces, or steep or tilted surfaces. In the event that the solution is splashed against the underside of baffle plate 100, a filtration device will be located in intermediate boss 135, having preferably a 225 micron nominal pore size may be provided. This will prevent particles from passing above the baffle plate. Liquid that passes above the baffle plate will be prompted to drain back into the reservoir. The angles and elevation of the baffle plate filter will tend to prevent direct aspiration of solution into the outlet fitting 95 of device 25. Outlet 85 of lid 75 may also be provided with a filtration device having preferably a 225 micron nominal pore size may be provided. Any liquid reaching this location will be atomized into small droplets when subjected to the velocity of the exit gases from device 25.

A preferred filter device may be obtained from Porex Industries, and is fabricated from polypropylene. Alternatively, a metal screen having a substantially similar nominal pore size, may be used.

FIGS. 15–16 illustrate an emissions control device 25' according to an alternative embodiment of the invention, wherein elements having similar structure and function to those of the embodiment of FIGS. 2–14A, 14B are provided with like reference numerals, augmented by primes ('). Device 25' is provided with a substantially flat baffle plate 100', with a large aperture 130' for receiving interior inlet tube 140', and a plurality of smaller intermediate apertures 135'. Interior inlet tube 140' has a stepped configuration at its lower end, with apertures 142' extending in both axial and radial directions.

As the vehicle is operated, there will be some attrition of the solution level in device 25, over time, as a result of evaporation, and/or chemical reaction. Solution may be added as needed to maintain the level determined to be appropriate for the device, as sized to the particular engine. However, a complete change-out of the solution, and a cleaning of the interior surfaces of the device, will be necessary from time to time, in order to remove oily residue and particulate materials from the reservoir. Preferably, device 25 should be sized, so that under normal operating conditions and assuming normal usage, the solution should be completely changed approximately as often as the crankcase oil itself is changed, e.g., every three months or three thousand miles driven.

In addition to the physical and chemical treatment of crankcase emissions materials which is performed by device 25 (25'), it has been determined that treatment of the "cleaned" gases leaving the device 25 (25') by electronic ionization also has beneficial effects. Accordingly, in addition to the device 25, the apparatus for the treatment of crankcase emissions materials may also include a device for the electronic treatment of crankcase emissions materials. FIGS. 17–21 illustrate an ionizer apparatus used in association with the present invention.

Ionizer 55 comprises base 155, with maze walls 160 and 165, and diagonal wall 167, on the inlet side of ionizer 55. The inner surfaces of the peripheral walls of base 155 may be provided with ledges 170, upon which intermediate wall 175 may rest. Intermediate wall 175 may also rest atop the upper ends of walls 160, 165, 167 to form charging chamber maze 178. Intermediate wall 175 has a plurality of apertures 180, through which ion emitter pins 185 project, into charging chamber maze 178, between walls 160 and 165. Emitter pins 185 project from circuit board 190, which is covered by cover 195. Base 155 includes inlet fitting 200 and outlet fitting 205, which connect with corresponding apertures in the walls of base 155. Maze walls 160 and 165 have apertures 210 and 215, respectively, for permitting passage of gases through maze 178. When the components of ionizer 55 are assembled, preferably with at least base 155 and cover 195 being fabricated from a durable plastic material and which can be sealing affixed to one another, an air-tight passage is formed. It is believed that the construction of maze walls 160, 165, and diagonal wall 167, induce a swirling action to the flow of "cleaned" crankcase gases through the ionizer, optimizing the charging of the gases, vapors, etc. passing through the ionizer. Although a particular maze configuration is shown herein, the configuration may be modified, in accordance with the requirements of a particular application, and not depart from the principles of the present invention, if a swirling motion is produced.

The components of circuit board 190 preferably comprise a direct current to alternating current converter 220, the function of which is to change DC voltage, available in an automotive application, to AC voltage, to be amplified through transformer 225, with a suitable voltage amplification factor to provide voltage and current to multi-stage, capacitive coupled, series connected diode array voltage multiplier 230, arranged to provide an optimum particle charge to emitter pins 185. Emitter pins 185, as stated earlier, project into charge chamber maze 178. Crankcase emissions materials flowing through maze 178 are forced, by the contoured surfaces, to swirl and counter-swirl, prompting maximum contact with the emitter pins 185. Maximum contact prompts maximum charging of the gas and gaseous particles. Thus an optimum quantity of charged particles will be generated for transport to the intake air stream.

Carefully consideration of component parts must be made in order to avoid degradation of and/or interference with engine control onboard computer or other electronic device used in or about the vehicle. Proper shielding, feedback protection and isolation are important. It is believed that frequencies of 15–20 kHz are appropriate and should present no significant difficulties with respect to interference issues, although other frequencies may be used, as desired and/or other characteristics of the vehicle or other apparatus, into which the invention is to be installed, dictate.

It is believed that voltages for generating a significant suitably charged field can be as low as 600v. Voltages in the range of 1200–8000v are believed to be optimal for achieving the desired performance, although any ionizing voltage will have some effect.

FIGS. 21 illustrates a possible circuit schematic for the oscillator circuitry for the ionizer. Although desired numerical values for various components have been provided, one of ordinary skill in the art, having the present disclosure before them, will be able to modify these circuits and vary the numerical values, to produce suitable ionizer apparatus, without departing from the scope of the invention. In addition, the particular configuration and placement of the electrical connections may be modified without departing from the scope of the invention.

The electronic device 55 of the present invention may be used in conjunction with the liquid treatment device 25, in a position downstream from device 25. Alternatively, electronic device 55 may be used by itself in the flow path from the PCV valve to the intake vacuum port, although cleaning of the electronic device 55 to remove oily/particulate deposits will be required more often than if device 55 were used in association with liquid treatment device 25.

Unlike prior art devices, which may have incorporated both liquid filtering and electronic ionization apparatus, within a single bulky housing, the present invention separates these two functions, into two separate units. This enables the ionizer to be positioned downstream of the liquid filtering unit, and downstream of the PCV valve itself, as well. In addition, the construction of the present invention permits the ionizer unit to be positioned as closely to the intake manifold/throttle body, as physical space limitations and the heat of the engine permit. In this way, the volume and strength of the field of charged particles is increased. The farther the ionizer is positioned from the intake manifold, etc., the more likelihood there is that the charged gases and gaseous particles will lose their charge. Ideally, a linear distance of approximately 1 foot upstream from the intake manifold, if feasible, is desired. Some of the advantages believed to result from the ionization of the gases is that the combustible elements of the crankcase emissions materials are prompted to be more easily combusted, and that a "cleaning" action is induced in the combustion system, prompting cleaner burning and the expulsion or removal of hydrocarbon deposits and inhibition of corrosion.

The present invention also comprises a mounting system configured for the mounting of the emissions control device, as illustrated in FIGS. 2, 3, 22–32. The mounting system comprises a first flat bracket 240 that mounts to lid 70 and is able to adjust fore and aft about the "z" axis via a plurality of mounting holes 245 and is also able to adjust angularly about the horizontal "x" axis by rotating the bracket about the selected mounting hole. A second angled bracket 250 is attached to the flat bracket 240 with a screw 257 that passes through apertures 241 and 242 in tabs 243, 244 of bracket 240, and through one of apertures 251, 252 on tabs 253, 254, respectively, of bracket 250. Brackets 240, 250 may be fabricated from any suitable material, such as metal or durable plastic. The connection acts as a hinge and is able to adjust angularly about the vertical "y" axis. A toothed lock washer 256, such as are known in the fastener art, is placed at one end of screw 257, to be in compression between one of tabs 253, 254, and one of tabs 242, 243 to provide a gripping force, once screw 257 has been tightened down, to help hold bracket 240 in the selected angular position relative to bracket 250. In the embodiment as illustrated in FIG. 29, the end of screw 257 is threaded, and the interior of aperture 241 is likewise matingly threaded, to engage with the end of screw 257.

One of tabs 253, 254 can be selected that will allow for mounting either in a horizontal or vertical position relative to bracket 240. In particular, each of tabs 253, 254 permits positioning of bracket 240, in a range of angular positions, relative to bracket 250. The range of positions available when tab 253 is used, centers around a position which is substantially perpendicular to the position around which the range of positions centers, when tab 254 is used. The design allows for adjustments in the "x", "y" and "z" axes and gives maximum versatility thereby allowing for the device 25 to be mounted in many different engine compartment configurations in many different vehicles.

Bracket 250 is also provided with two apertures 258, which are configured to enable attachment of bracket 250 to a structure within the engine compartment, by bolts or metal screws, for example.

Figure 30:
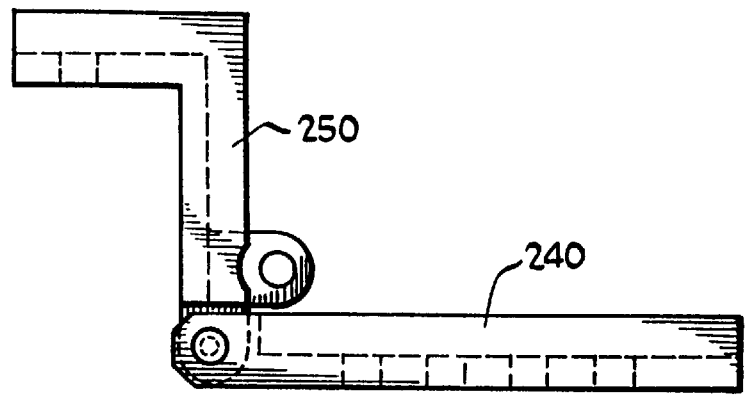
FIG. 30 is a side elevation of the bracket members in one orientation.
Figure 31:
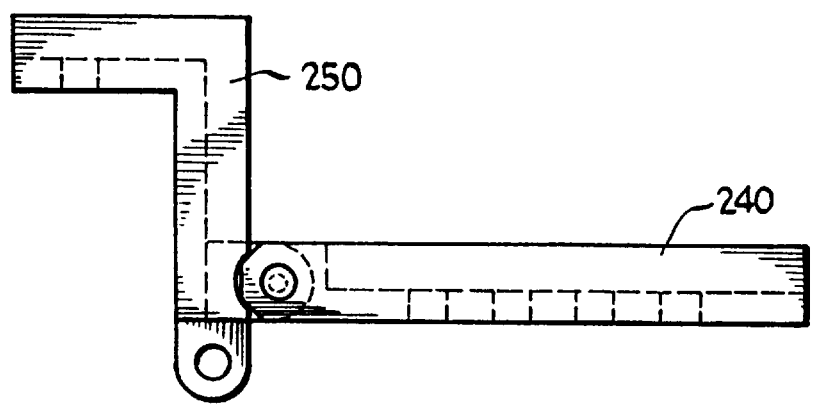
FIG. 31 is a side elevation of the bracket members in an alternative orientation.
Figure 32:
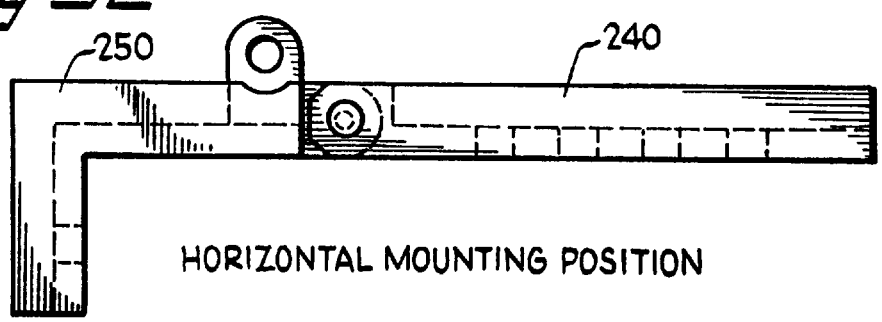
FIG. 32 is a side elevation of the bracket members in a further alternative orientation.
Figure 33:
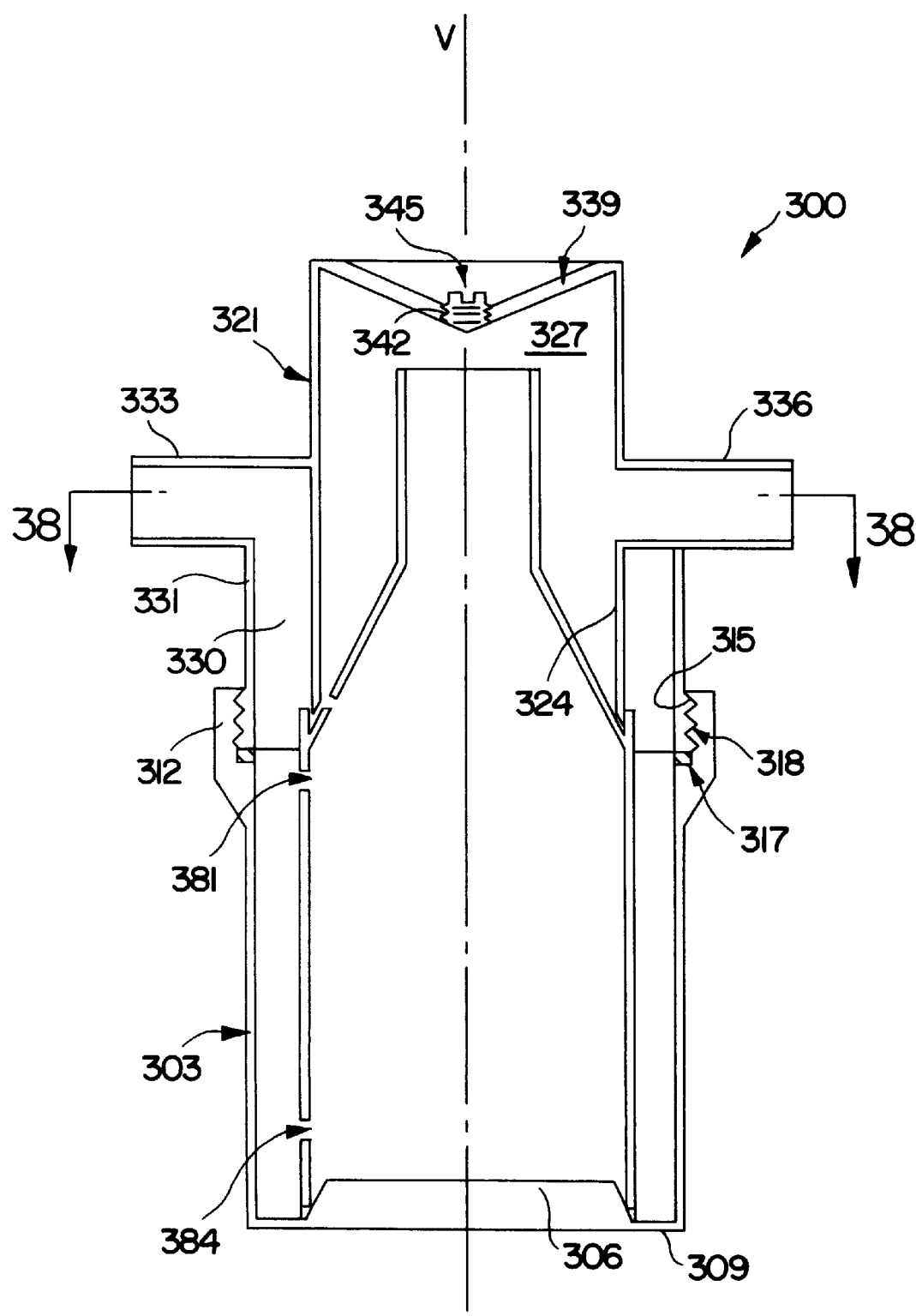
FIG. 33 is a side elevation in section of the liquid filter medium reservoir according to a further embodiment of the invention.
Figure 35:
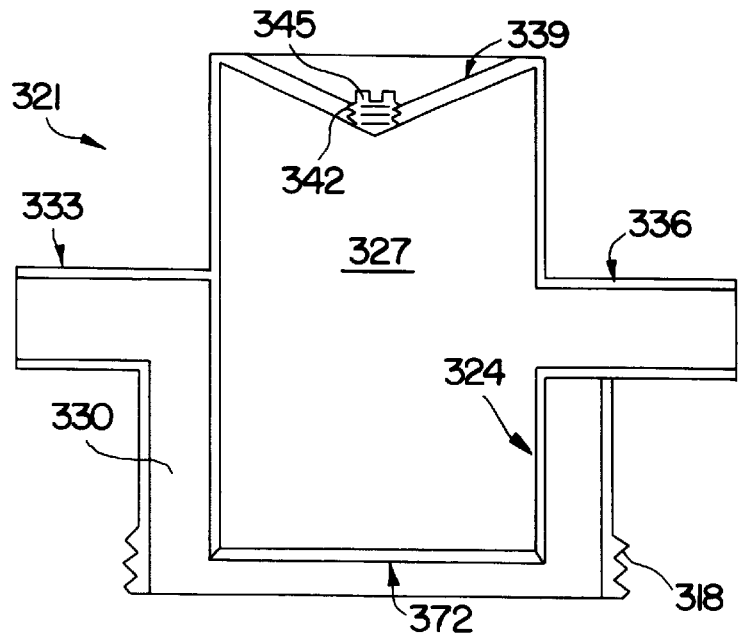
FIG. 35 is side elevation in section of the reservoir top of the embodiment of FIG. 33.
Figure 34:
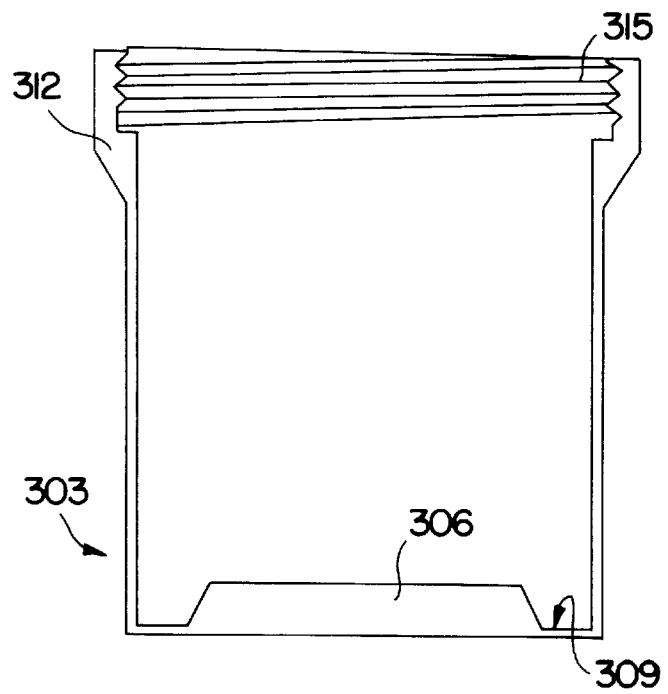
FIG. 34 is a side elevation in section of the base of the reservoir of the embodiment of FIG. 33.
Figure 36:
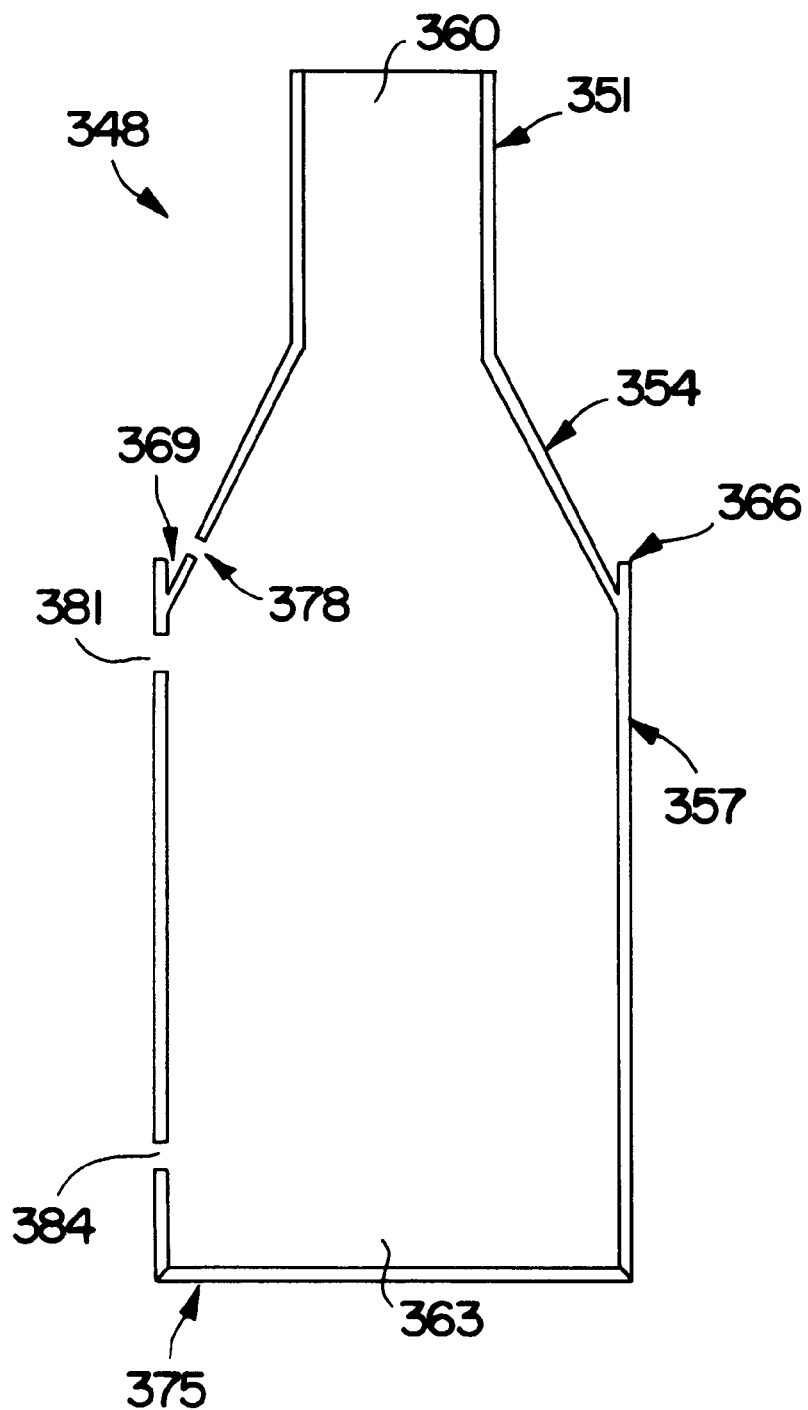
FIG. 36 is a side elevation in section of the baffle for the liquid filter medium reservoir of the embodiment of FIG. 33.
Figure 37:
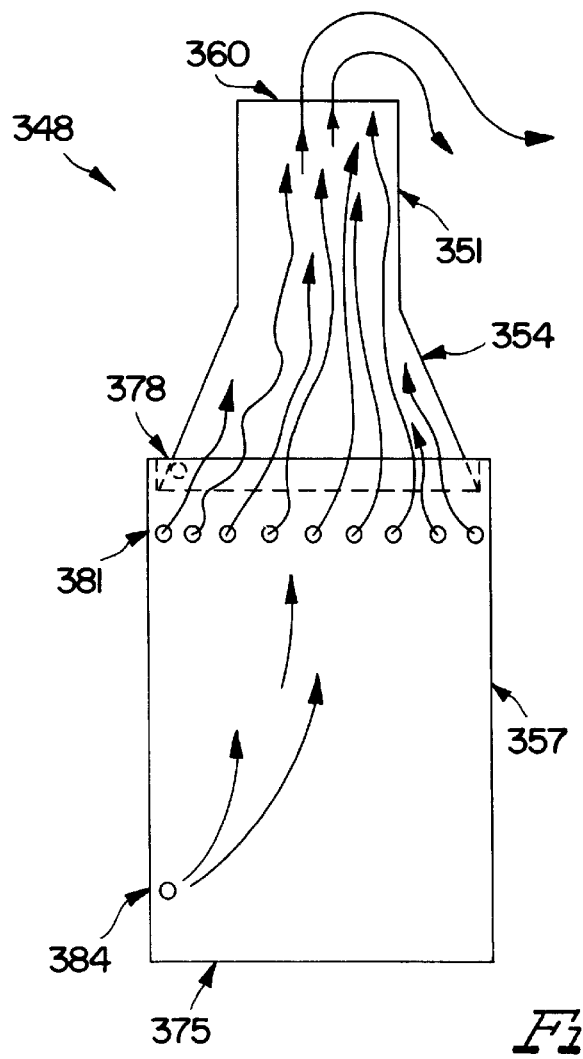
FIG. 37 is a side elevation of the baffle for the liquid filter medium reservoir of the embodiment of FIG. 33, showing the flow path of the gases being filtered.
Figure 38:
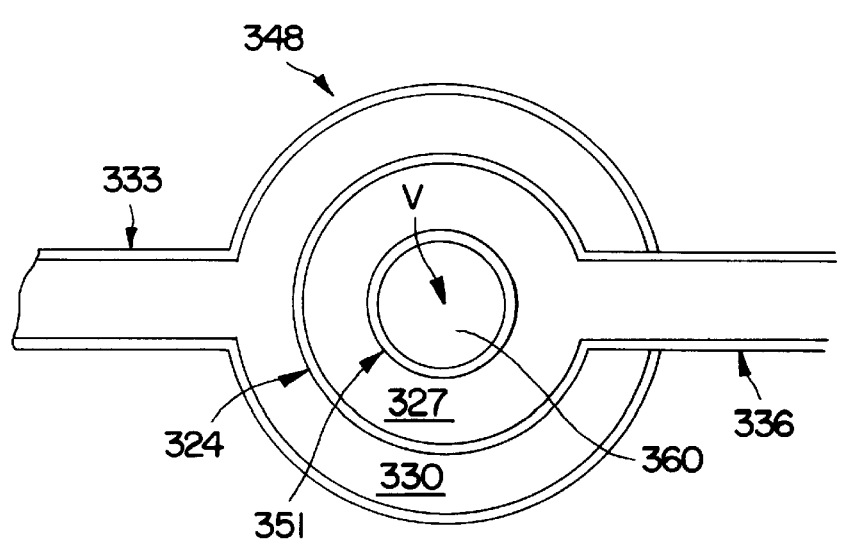
FIG. 38 is a top plan sectional view taken along lines 38-38 of FIG. 33.
Figure 39:
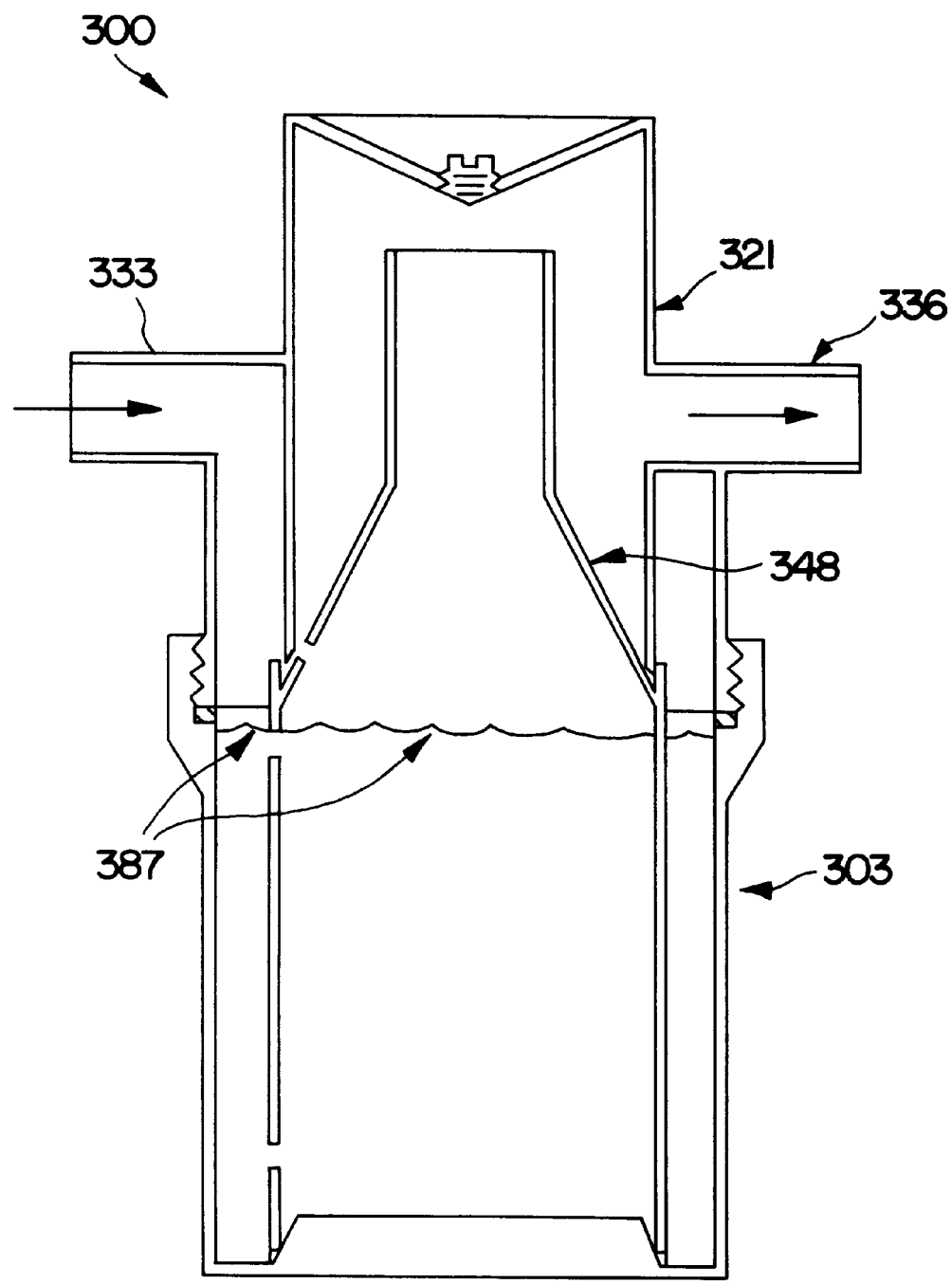
FIG. 39 is a side elevation in section of the liquid filter medium reservoir, having liquid filter medium in it when the vehicle engine is not running.

FIGS. 30–32 illustrate three potential orientations of brackets 240 and 250, which can be obtained.

A typical installation procedure for the apparatus of the present invention is as follows.

1. Locate and remove original PCV valve and hose.
2. Mount the device 25 in a suitable location, allowing access to the inlet and outlet fittings.
3. Install the hose adapter in the original PCV grommet.
4. Route a section of new PCV hose from the previously installed hose adapter to the device inlet fitting using suitable fittings and clamps. The device 25 should be mounted so that the inlet and outlet fittings are substantially upright and on top.
5. Install the proper size outlet fitting into the device 25 outlet port, connect a short length of either ½" or ¾" ID hose, to match the PCV valve OD, to the outlet elbow then install the original PCV valve into the hose, route a new PCV hose from the PCV valve to the PCV port at the intake manifold. Locate a suitable location for the electronic assembly and install it in the PCV hose between the PCV valve and the engine. Use nylon tie straps to secure hoses and wires for a neat installation. Clamp all hose connections.
6. Remove the top section of the device 25 by removing the wing nut and fill to the operating level with the solution as selected.
7. Connect the negative/black lead from the ionizer unit 55 to a good vehicle ground, connect the positive/red lead to a circuit that has +12vDC with the ignition key in the run position.
8. Check hose routing for interference, start engine and run for 30 seconds, stop the engine and check for leaks.

The apparatus of the present invention is believed to improve emissions by reducing the production of unburned or incompletely burned hydrocarbons, carbon monoxide and oxides of nitrogen. Improvement in fuel efficiency is also believed to result.

FIGS. 33–40 illustrate a further embodiment of the liquid filter medium reservoir which is configured for improved resistance to spillage of the liquid medium, as well as improved resistance to siphoning of the liquid into the engine.

FIGS. 33–40 illustrate the components of the liquid filter medium reservoir. Each of the components of the liquid filter medium reservoir, according to one preferred embodiment illustrated in FIGS. 33–40, are, except as specifically noted herein, generally circumferentially symmetrical and radially symmetrical about a common vertical axis V (FIG. 33) of liquid filter medium reservoir 300. Reservoir 300 includes a base 303. Base 303 is formed as a cylindrical cup, having a raised portion 306 in the bottom 309. The interior surface of lip 312 is threaded on its inner surface. Female threads 315 on base 303 mate with male threads 318 of top 321.

Reservoir top 321 is divided by interior cylindrical wall 324 into central cylindrical region 327 and surrounding annular space 330. Cylindrical passage 333 enters from one side of top 321 and communicates with annular space 330. Another cylindrical passage 336 enters from an opposite side of top 321 and communicates with central cylindrical region 327. As previously indicated, top 321 is configured to be screwed down into and onto base 303 so as to create a substantially fluid tight seal where top 321 meets and joins to base 303. The upper surface 339 of top 321 is conically concave, and includes a central aperture 342 which may be internally threaded to receive a threaded screw plug 345, the function of which will described in further detail hereinafter.

An O-ring gasket 317 is positioned between top 321 and base 303. Preferably, gasket 317 will be fabricated from neoprene or some other synthetic material, such as Bunna-N, which is resistant to attach from oil, antifreeze, and the like.

Baffle member 348 is received within reservoir top and bottom 321, 303 and held by wall 324 of top 321 against the bottom 309 of base 303. Baffle member 348 comprises a first narrow cylindrical portion 351, a truncated conical portion 354 and a bottom cylindrical portion 357. Both the top end 360 and bottom end 363 are open. Conical portion 354 intersects the top of cylindrical portion 357 at a position below top edge 366 of cylindrical portion 357 to define a gutter 369. The bottom edge 372 of wall 324 is beveled at an angle substantially equal to the angle of the conical portion 354 of baffle 348. Similarly, the bottom edge 375 of baffle 348 preferably is beveled at an angle substantially equal to the angle of the sides of raised portion 306 of bottom 309 of base 303. Base 303, top 321 and baffle member 348 are all preferably sized, so that for assembly of reservoir 300, baffle 348 is placed within base 303 so that the bottom 363 of baffle 348 fits snugly around raised portion 306. Top 321 is then placed onto base 303 and the two components are screwed together. As top 321 is screwed down onto base 303, bottom edge 372 of wall 324 enters into sill 369 and the beveled bottom edge 372 of wall 324 engages the side of conical portion 354. As the tightening is continued, top 321 pushes down on baffle 348, which in turn pushes baffle 348 down onto and against the sides of raised portion 306 of base 303. Upon sufficient tightening, substantially liquid-tight seals are created between bottom edge 372 of wall 324 and the outer surface of conical portion 354 of baffle 348, and between the bottom beveled edge 375 of baffle 348 and the sides of raised portion 306 and bottom 309. The compressibility of gasket 317 permits the top and base to be screwed together tightly enough to create the seals.

As an alternative to the use of a screw-threaded connection between the reservoir top and the reservoir base, it may be desirable, for economic reasons, to simply permanently attach the top and base, such as by cementing, sonic or heat welding, friction welding, coining, etc. Such a construction would not be freely openable, to permit total access cleaning, but suitable ports (filled by threaded plugs, etc.) may be provided for rinsing with cleaning agents.

In addition to top opening 360 and bottom opening 363, baffle 348 preferably includes a drain-back hole 378, a plurality of top apertures 381 and a bottom aperture 384, the purposes of each of which will be described hereinafter.

A liquid filtering medium is introduced into the assembly, either prior to assembly or after, through aperture 342. The level of the liquid, with the engine turned off, would preferably be up to the tops of top apertures 381 as indicated by reference numeral 387 in FIG. 39. Inlet 333 would be connected to the output from the positive crankcase ventilation valve opening in the engine while outlet 336 would be connected to the line leading to the replaced positive crankcase ventilation valve so that the flow of gases through the inlet and outlet are indicated by the arrows in FIG. 39.

Figure 40:
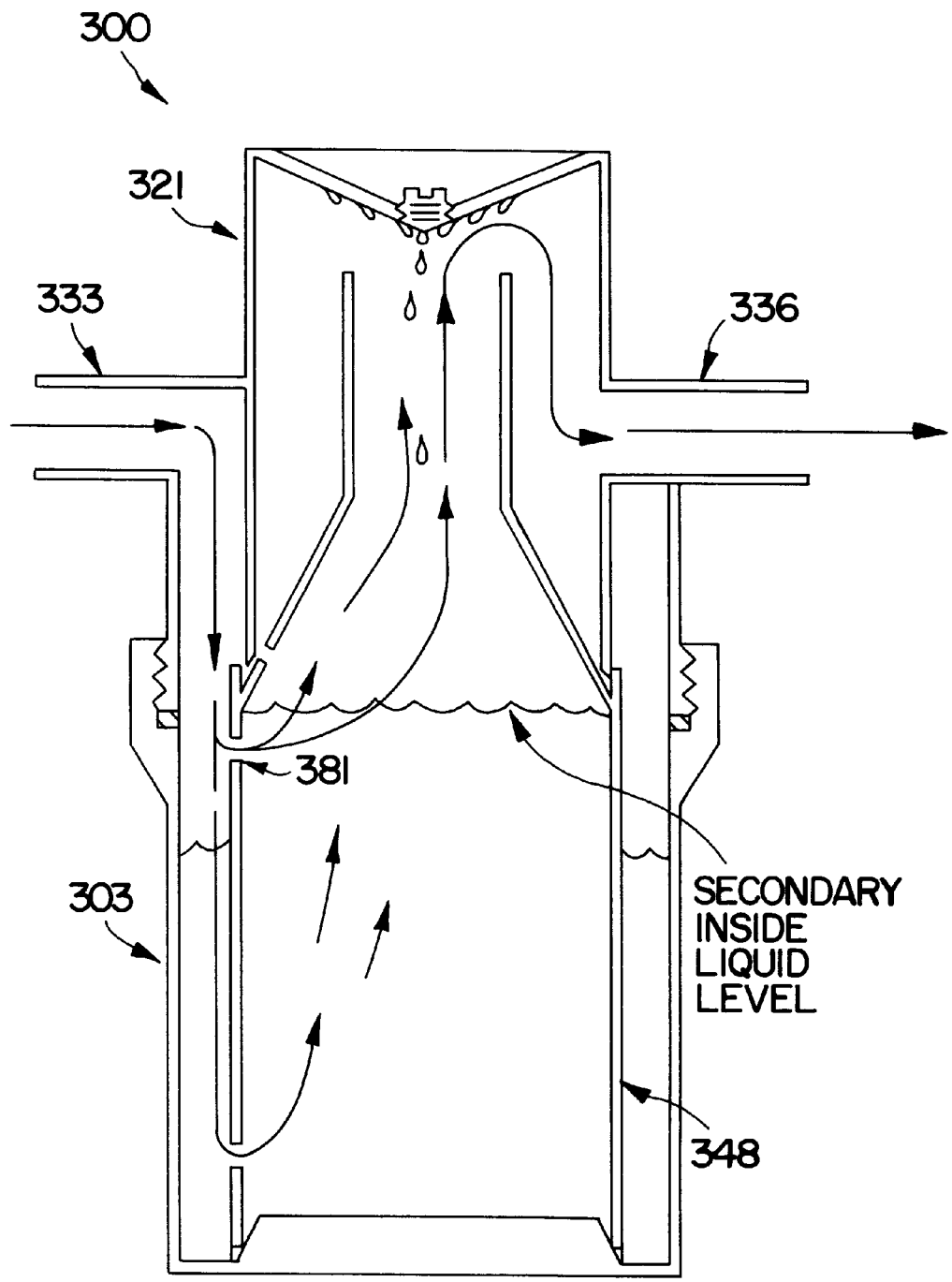
FIG. 40 is a side elevation, in section, of the liquid filter medium reservoir of the embodiment of FIG. 33, with liquid filter medium therein, shown during a steady state motor running operating conditions.

Once the engine has been turned on, as indicated in FIG. 40, the suction imposed upon the outlet 336, combined with the positive back pressure going into the inlet from the positive crankcase valve opening will cause the liquid level inside the baffle to rise while the liquid level in the annular space between the baffle and the base drops. Thus, the liquid level within the walls of the baffle rises to a position above the top apertures 381. The flow of gases through reservoir 300 is illustrated by the arrows in FIG. 40. The gases will flow into inlet 333 downward in the space between wall 324 of top 321, the cylindrical wall 357 of baffle 348 and the inner surface of base 303.

The presence of bottom aperture 384 creates the liquid level differentiation shown in FIG. 40, drawing the liquid inside the baffle member 348 above the level of top apertures 381, so long as the original liquid level is approximately the level of the top apertures 381. In a preferred embodiment of the invention, the top and bottom aperture diameters should be on the order of 3/32-in. diameter. If the apertures become significantly larger, then the flow of gases drawn through the apertures may not be as fast.

A plurality of top holes are required, so that the minimum flow rate requirements of the PCV system can be accommodated. In the embodiment of FIGS. 33–40, the majority of the PCV gases would be expected to pass through the top apertures, although some percentage will pass through the bottom aperture. A plurality of spaced small top holes, in the vicinity of the static liquid level, is believed to be more effective, in view of the level differentiation (in running mode), in causing gas flow through the filter medium, than the use of one or only a few larger apertures. In addition, spreading the top apertures around the circumference is also accommodation for the working environment of the filter apparatus, in that vibration, sloshing caused by accelerations and decelerations, and tilting of the housing can be expected, so at least some of the top apertures may be partially covered by the liquid on the inside of the baffle member, at all times during such operational periods, even with low liquid levels.

It is anticipated the liquid filter medium will be consumed over time, as a result of simple evaporation, and through the liquid being carried off as vapor or fine droplets, by the gas flow. In order to slow this carrying-away of the vapor, it is appropriate to cause the precipitation of liquid vapor, and the provision of a tortuous path, so that gas-borne liquid droplets will collide with and collect on the interior surfaces of the housing and the surfaces of the baffle member, for drainage back to the liquid pool in the reservoir base. Accordingly, making the top of the baffle member higher than the exit from the housing, creates a turning path, which promotes separation of the contaminants from the gas flow.

It is believed that even if the liquid is consumed to a degree that the top apertures will be partially or completely uncovered by liquid, in the engine-running state, the provision of the top apertures will serve to strip the larger contaminant particles and droplets from the gas flow, thus resulting in some beneficial effect, though perhaps less than optimal.

The conical configuration of the top of reservoir top 321 prompts the formation of condensation droplets of the liquid filter medium. Because the lowest point of the conical shape is above the central axis of reservoir 300, the droplets, when sufficiently fully formed, will fall back into the secondary liquid filter medium region.

In the embodiment of FIGS. 33–40, the reservoir base 303, the reservoir top 321 (including walls 324 and 331), and baffle member 348, are all tubular bodies of revolution, substantially radially symmetrical above vertical axis V. This promotes ease of manufacture, a reduction of material usage, and a consistency of operation, regardless of the orientation (about axis V) of the apparatus within the engine compartment. However, the transverse (perpendicular to axis V) cross-sections of the components may have other configurations, such as polygonal, rectangular, or even triangular, without departing from the scope of the present invention.

Figure 41:
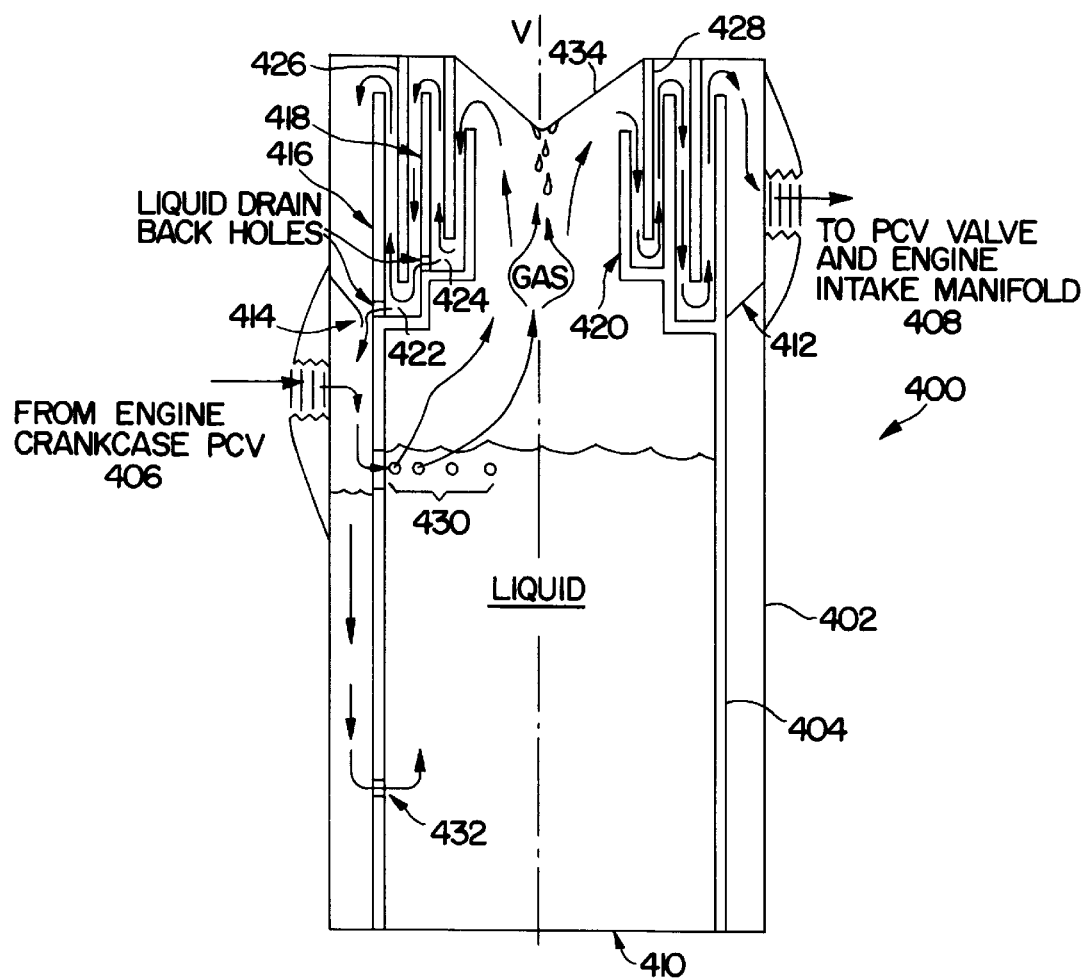
FIG. 41 is a side elevation, in section, of a liquid filter medium reservoir according to another alternative embodiment of the invention.

FIG. 41 illustrates still another alternative embodiment of the invention. Filter apparatus 400 is configured to be a sealed structure, incorporating housing 402, and baffle member 404. Like the embodiment of FIGS. 33–40, apparatus 400 is generally symmetrical about vertical axis V. Housing 402 includes inlet 406 and outlet 408. In a preferred embodiment of the invention, housing 402 may be originally formed as upper and lower halves (not shown separately), into which baffle member 404 is positioned, and then the two halves are permanently sealed to one another. Baffle member 404 may be sealingly affixed at its bottom edge to the bottom 410 of housing 402. Angled circumferential ledge 412 sealing connects baffle member 404 to the inside surface of housing 402, except for one or more drain apertures 414. Baffle member 404 may be provided with one or more upwardly extending circling baffle walls 416, 418, 420, etc., provided with one or more drain holes 422, 424, etc. Corresponding circling baffle walls 426, 428, etc. may be provided, extending downwardly from the top of housing 402 between baffle walls 416, 418, 420.

Baffle member 404 is also provided with top apertures 430 and bottom aperture 432, which operate in a manner substantially the same as the corresponding apertures in the baffle member of the embodiment of FIGS. 33–40. A downward-extending conical depression 434 may be provided in the top of housing 402, for promoting condensation and dropping of filter medium back into the body of liquid. A threaded plug (not shown) may be received in an aperture (not shown) in the conical depression 434 (as in the similar structure of the embodiment of FIGS. 33–40), for permitting filling of the housing 402 with filter medium.

In operation, PCV gases will be drawn through the top and bottom apertures in the baffle member, and then up and down, successively radially outwardly past the baffle walls, until the gases reach the outer annular chamber defined by baffle wall 416, housing 402 and ledge 412, and then exit the housing 402 through outlet 408. Preferably, as only one or two of each of drain apertures 414, 422, 424 are provided, as compared to several top apertures 430, bottom aperture 432, and further in view of the suction being exerted on outlet 408, little, if any of the PCV gases are pulled directly from the vicinity of inlet 406, "backwards" through aperture 414, without passing through the liquid filter medium.

While the embodiment of FIG. 41 is illustrated and described as being a completely sealed construction (for reduced cost and manufacturing simplicity) and thus of necessity, disposable after a certain period of use, it is contemplated that an alternative embodiment may be substantially sealed, but with a simplified removable plug or cap, to enable replenishment of the liquid filtering medium, or rinsing with a suitable solvent.

While a particular pattern of ascending and descending baffle walls is shown and described with respect to the embodiment of FIG. 41, it is to be understood that the pattern and manner of formation of the baffle walls may be modified (e.g., changing a wall ascending from an insert beneath to a wall descending from a top of the reservoir), as may be desired and/or prompted by manufacturing considerations, etc., without departing from the scope of the invention.

In addition to serving to trap hydrocarbon particulate materials through the use of a liquid filter medium, it is believed that even in the total absence or consumption of the liquid filter medium, the apparatus can still serve to remove undesired materials from the flow of gases. By creating a tortuous pathway for the PCV gases through the housing, such particulate materials, hydrocarbon residues and the like will collide with the baffle surfaces in the housing and collect as a form of sludge on the interior surfaces and in the bottom of the reservoir. Among the undesirable components which will be, at least in part, separated from the gas flow, may be water soluble corrosives and condensates (formed through the action of temperature and water vapor on the petroleum hydrocarbons in the combustion gases, etc.), which might otherwise have a harmful effect upon the metal surfaces of the engine intake system and piston and cylinder surfaces. Such corrosives may include such materials as sulfuric acid (although the exact composition of such materials is difficult to ascertain, being a function of the combustion mixture, and other chemicals present in the crankcase volume).

The foregoing description and drawings merely explain and illustrate the invention, and the invention is not limited thereto except insofar as the appended claims are so limited, as those skilled in the art who have the disclosure before them will be able to make modifications and variations therein without departing from the scope of the invention.

What is claimed is:

1. A system for the treatment of crankcase emissions materials, in a positive crankcase ventilation system of an internal combustion engine, in which the crankcase emissions materials, containing at least one of partially and completely unburned hydrocarbon materials, oil, particulate materials and gaseous combustion byproducts, are drawn from the crankcase of the engine and directed to an air intake portion of the engine for recirculation through and further combustion in the engine, the system for treatment of crankcase emissions materials in a positive crankcase ventilation system comprising:

a filtering apparatus, for containing a liquid filter medium, the filtering apparatus being operably configured to receive therethrough crankcase emissions materials conducted substantially directly from the crankcase of an internal combustion engine, for substantially separating said at least one of said partially and completely unburned hydrocarbon materials, oil, particulate materials and gaseous combustion byproducts from crankcase emissions materials;

a positive crankcase ventilation valve, operably positioned downstream from the filtering apparatus, for regulating the pressure of crankcase emissions materials passing through the filtering apparatus;

an electronic apparatus, operably positioned downstream from the positive crankcase ventilation valve, for imparting an electrostatic charge to the filtered crankcase emissions materials, prior to delivery of the filtered crankcase emissions materials to the air intake portion of an internal combustion engine;

the filtering apparatus further comprising a housing, having an inlet and an outlet;

the inlet of the housing being operably connected, at least indirectly, to a positive crankcase ventilation outlet of an internal combustion engine, the outlet of the filter medium reservoir being operably connected, at least indirectly, to a positive crankcase ventilation vacuum port of an internal combustion engine;

at least one baffle member, operably disposed within the housing, and configured for constraining introduction of the crankcase emissions materials, from the crankcase, into at least one treatment chamber defined by the housing and the at least one baffle member.

2. The system according to claim 1, wherein the housing comprises:

a substantially hollow reservoir base operably configured for receiving and containing a liquid filter medium; and a reservoir top, including an inner treatment chamber, and a surrounding outer treatment chamber.

3. The system according to claim 2, wherein the reservoir base is an open-topped treatment chamber, defined by a first tubular side wall having an upper rim, and a bottom wall;

the inner treatment chamber of the reservoir top is an open-bottomed treatment chamber, defined by a second tubular side wall having a lower rim; and the outer treatment chamber is defined by a third tubular side wall surrounding at least a portion of the second tubular side wall, the wall of the outer treatment chamber having a lower rim.

4. The system according to claim 3, wherein the inlet is disposed in the reservoir top, in fluid communication with the outer treatment chamber thereof, and the outlet is also disposed in the reservoir top, in fluid communication with the inner treatment chamber thereof.

5. The system according to claim 4, wherein the at least one baffle member comprises:

an open-topped tubular member, operably configured, upon positioning within the housing, for defining an inner treatment chamber of the reservoir base, that is in fluid communication with the inner treatment chamber of the reservoir top, and an outer treatment chamber, disposed between a tubular side wall of the tubular member and the first tubular side wall of the reservoir base;

the outer treatment chamber being in fluid communication with the outer treatment chamber of the reservoir top;

at least one aperture extending through the tubular side wall of the tubular member;

the tubular member further being operably configured for cooperation with the reservoir top, so that upon assembly of the housing and at least one baffle member, direct fluid communication between the outer treatment chamber of the reservoir top and the inner treatment chamber of the reservoir top are substantially precluded, so that fluid passing through the housing is constrained to pass, in succession, into the inlet, through the outer treatment chamber of the reservoir top, to the outer treatment chamber of the reservoir base, then to the inner treatment chamber of the reservoir base, then to the inner treatment chamber of the reservoir top and through the outlet, thus passing through liquid filter medium that may be disposed within the reservoir base.

6. The system according to claim 5, wherein the tubular member further comprises:

a first tubular portion, having an upper rim region and operably configured to be received within the reservoir base, and having a width substantially equal to the width of the lower rim of the wall of the inner treatment chamber of the reservoir top;

at least one abutment surface, disposed proximate the upper rim region of the first tubular portion, for engaging the lower rim of the wall of the inner treatment chamber of the reservoir top, when the tubular member is placed in the reservoir base and the reservoir base and reservoir top are assembled, so that the reservoir top forces a lower rim of the first tubular portion of the tubular member against the bottom wall of the reservoir base, to create substantially fluid tight seals between the lower rim of the inner treatment chamber of the reservoir top and the at least one abutment surface, and between the lower rim of the first tubular portion of the tubular member and the bottom wall of the reservoir base.

7. The system according to claim 6, wherein the at least one aperture in the tubular member is disposed proximate the upper rim region of the first tubular portion.

8. The system according to claim 6, wherein the at least one aperture in the tubular member is disposed proximate the lower rim of the first tubular portion.

9. The system according to claim 6, wherein the at least one aperture in the tubular member comprises at least two apertures in the first tubular portion, at least a first of the at least two apertures being disposed proximate the upper rim region of the first tubular portion, and at least a second of the at least two apertures being disposed proximate the lower rim of the first tubular portion.

10. The system according to claim 6, further comprising means for inhibiting suction of liquid filter medium into the intake system of an internal combustion engine to which the system is connected.

11. The system according to claim 10, wherein the upper rim region of the first tubular portion of the tubular member defines a predetermined height corresponding to a maximum amount of liquid filter medium to be placed in the housing, the means for inhibiting suction of filter medium further comprising:
 a second tubular portion of the tubular member, having a diameter predominantly less than the diameter of the inner treatment chamber of the reservoir top;
 the second tubular portion of the tubular member emanating from and extending above the first tubular portion of the tubular member, to an elevation higher than the outlet of the inner treatment chamber of the reservoir top, when the housing and at least one baffle member are assembled, so that the housing may be tipped up to a predetermined angle, without having filter medium reach the outlet of the housing.

12. The system according to claim 11, further comprising means for returning liquid filter medium, that may be carried out of the inner treatment chamber of the reservoir base and subsequently condense in the inner treatment chamber of the reservoir top, to the inner treatment chamber of the reservoir base.

13. The system according to claim 12, wherein the means for returning filter medium comprises:
 a top wall of the inner treatment chamber of the reservoir top, contoured to have a low point disposed above the open top of the tubular member, so that filter medium that may condense on an inner surface of the top wall of the inner treatment chamber will be prompted to collect and drip off from the low point, back into the inner treatment chamber of the reservoir base.

14. The system according to claim 12, wherein the means for returning filter medium comprises:
 an aperture in the second tubular portion of the tubular member, for permitting condensed liquid filtering material that may become trapped between the second tubular portion of the tubular member and the wall of the inner treatment chamber of the reservoir top, to flow back into the inner treatment chamber of the reservoir base.

15. The system according to claim 1, further comprising:
 means, operably disposed in the reservoir base, for facilitating the chemical alteration of at least a portion of the crankcase emissions materials.

16. The system according to claim 15, wherein the means for facilitating chemical alteration of at least a portion of the crankcase emissions materials comprise means for establishing a galvanic cell in the reservoir base.

17. The system according to claim 16, wherein the means for establishing a galvanic cell in the reservoir base comprises at least one material from the group consisting of members made of dissimilar metals in the galvanic series.

18. The system according to claim 1, wherein the electronic apparatus comprises:
 an electronic ionizer apparatus for imparting a charged particle field to treated crankcase emissions materials exiting from the housing for a liquid filter medium therein, the electronic ionizer apparatus being operably positioned downstream from the housing for a liquid filter medium therein.

19. The system according to claim 11, wherein the electronic ionizer apparatus further comprises:
 a housing, having an inlet and an outlet, portions of the housing defining an electronic treatment chamber,
 the inlet of the housing being operably connectable, at least indirectly, to a positive crankcase ventilation outlet of an internal combustion engine,
 the outlet of the housing being operably connectable, at least indirectly, to a positive crankcase ventilation vacuum port of an internal combustion engine;
 electronic circuitry, operably associated with the housing and including at least one emitter pin operably emanating into the electronic treatment chamber, for producing ionic emanations for producing a charged particle field within the crankcase emissions materials,
 the portions of the housing defining the electronic treatment chamber, including one or more wall members configured for producing a swirling motion to the crankcase emissions materials entering the electronic treatment chamber from the inlet of the housing, around the at least one emitter pin.

20. The system according to claim 1, wherein the electronic apparatus comprises an electronic ionizer apparatus further comprising:
 a housing, having an inlet and an outlet, portions of the housing defining an electronic treatment chamber,
 the inlet of the housing being operably connectable, at least indirectly, to a positive crankcase ventilation outlet of an internal combustion engine,
 the outlet of the housing being operably connectable, at least indirectly, to a positive crankcase ventilation vacuum port of an internal combustion engine;
 electronic circuitry, operably associated with the housing and including at least one emitter pin operably emanating into the electronic treatment chamber, for producing ionic emanations for producing a charged particle field within the crankcase emissions materials,
 the portions of the housing defining the electronic treatment chamber, including one or more wall members configured for producing a swirling motion to the crankcase emissions materials entering the electronic treatment chamber from the inlet of the housing, around the at least one emitter pin.

21. The system according to claim 5, wherein the cross-sections of each of the first tubular side wall, the second tubular side wall, the third tubular side wall and the tubular side wall of the tubular member have a common configuration selected from the group of shapes consisting of: cylindrical, rectangular, triangular.

22. The system according to claim 1, wherein the housing comprises:

a substantially hollow reservoir operably configured for receiving and containing a liquid filter medium.

23. The system according to claim 22, wherein the at least one baffle member comprises:

an open-topped tubular member, disposed within the housing, and defining a generally cylindrical inner treatment chamber and a generally annular outer treatment chamber.

24. The system according to claim 23, further comprising:

a fluid separator member, operably disposed between the housing and the at least one baffle member, for partitioning the generally annular outer member into a first annular outer member in direct fluid communication with the inlet to the housing, and a second annular outer member in direct fluid communication with the outlet from the housing.

25. The system according to claim 24, further comprising at least one circumferentially extending baffle wall emanating upwardly from the at least one baffle member toward a top wall of the housing.

26. The system according to claim 24, further comprising at least one circumferentially extending baffle wall emanating downwardly from a top wall of the housing toward the at least one baffle member.

27. An apparatus for the treatment of crankcase emissions materials, in a positive crankcase ventilation system of an internal combustion engine, in which the crankcase emissions materials, containing at least one of partially and completely unburned hydrocarbon materials, oil, particulate materials and gaseous combustion byproducts, are drawn from the crankcase of the engine and directed to an air intake portion of the engine for recirculation through and further combustion in the engine, the apparatus for treatment of crankcase emissions materials in a positive crankcase ventilation system comprising:

a filtering apparatus, for containing a liquid filter medium, the filtering apparatus being operably configured to receive therethrough crankcase emissions materials conducted substantially directly from the crankcase of an internal combustion engine, for substantially separating removing said at least one of said partially and completely unburned hydrocarbon materials, oil, particulate materials and gaseous combustion byproducts from crankcase emissions materials;

the filtering apparatus including a housing, having an inlet and an outlet;

the inlet of the housing being operably connected, at least indirectly, to a positive crankcase ventilation outlet of an internal combustion engine, the outlet of the filter medium reservoir being operably connected, at least indirectly, to a positive crankcase ventilation vacuum port of an internal combustion engine;

at least one baffle member, operably disposed within the housing, and configured for constraining introduction of the crankcase emissions materials, from the crankcase, into at least one treatment chamber defined by the at least one baffle member and the housing, the housing further comprising a substantially hollow reservoir base operably configured for receiving and containing a liquid filter medium; and a reservoir top, including an inner treatment chamber, and a surrounding outer treatment chamber.

28. The apparatus according to claim 27, wherein the reservoir base is an open-topped treatment chamber, defined by a first tubular side wall having an upper rim, and a bottom wall;

the inner treatment chamber of the reservoir top is an open-bottomed treatment chamber, defined by a second tubular side wall having a lower rim; and the outer treatment chamber is defined by a third tubular side wall surrounding at least a portion of the substantially tubular wall of the inner treatment chamber, the wall of the outer treatment chamber having a lower rim.

29. The apparatus according to claim 28, wherein the inlet is disposed in the reservoir top, in fluid communication with the outer treatment chamber thereof, and the outlet is also disposed in the reservoir top, in fluid communication with the inner treatment chamber thereof.

30. The apparatus according to claim 29, wherein the at least one baffle member comprises:

an open-topped tubular member, operably configured, upon positioning within the housing, for defining an inner treatment chamber of the reservoir base, that is in fluid communication with the inner treatment chamber of the reservoir top, and an outer treatment chamber, disposed between a tubular side wall of the tubular member and the first tubular side wall of the reservoir base;

the outer treatment chamber being in fluid communication with the outer treatment chamber of the reservoir top;

at least one aperture extending through the tubular side wall of the tubular member;

the tubular member further being operably configured for cooperation with the reservoir top, so that upon assembly of the housing and at least one baffle member, direct fluid communication between the outer treatment chamber of the reservoir top and the inner treatment chamber of the reservoir top are substantially precluded, so that fluid passing through the housing is constrained to pass, in succession, into the inlet, through the outer treatment chamber of the reservoir top, to the outer treatment chamber of the reservoir base, then to the inner treatment chamber of the reservoir base, then to the inner treatment chamber of the reservoir top and through the outlet, thus passing through liquid filter medium that may be disposed within the reservoir base.

31. The apparatus according to claim 30, wherein the tubular member further comprises:

a first tubular portion, having an upper rim region and operably configured to be received within the reservoir base, and having a width substantially equal to the width of the lower rim of the wall of the inner treatment chamber of the reservoir top;

at least one abutment surface, disposed proximate an upper rim region of the first tubular portion, for engaging the lower rim of the wall of the inner treatment chamber of the reservoir top, when the tubular member is placed in the reservoir base and the reservoir base and reservoir top are assembled, so that the reservoir top forces a lower rim of the first tubular portion of the tubular member against the bottom wall of the reservoir base, to create substantially fluid tight seals between the lower rim of the inner treatment chamber of the reservoir top and the at least one abutment surface, and between the lower rim of the first tubular portion of the tubular member and the bottom wall of the reservoir base.

32. The apparatus according to claim 31, wherein the at least one aperture in the tubular member is disposed proximate the upper rim region of the first tubular portion.

33. The apparatus according to claim 31, wherein the at least one aperture in the tubular member is disposed proximate the lower rim of the first tubular portion.

34. The apparatus according to claim 31, wherein the at least one aperture in the tubular member comprises at least two apertures in the first tubular portion, at least a first of the at least two apertures being disposed proximate the upper rim region of the first tubular portion, and at least a second of the at least two apertures being disposed proximate the lower rim of the first tubular region.

35. The apparatus according to claim 31, further comprising means for inhibiting suction of liquid filter medium into the intake system of an internal combustion engine to which the system is connected.

36. The apparatus according to claim 35, wherein the upper rim region of the first tubular portion of the tubular member defines a predetermined height corresponding to a maximum amount of liquid filter medium to be placed in the housing, the means for inhibiting suction of filter medium further comprising:

a second tubular portion of the tubular member, having a width predominantly less than the width of the inner treatment chamber of the reservoir top;

the second tubular portion of the tubular member emanating from and extending above the first tubular portion of the tubular member, to an elevation higher than the outlet of the inner treatment chamber of the reservoir top, when the housing and at least one baffle member are assembled, so that the housing may be tipped up to a predetermined angle, without having filter medium reach the outlet of the housing.

37. The apparatus according to claim 36, further comprising means for returning liquid filter medium, that may be carried out of the inner treatment chamber of the reservoir base and subsequently condense in the inner treatment chamber of the reservoir top, to the inner treatment chamber of the reservoir base.

38. The apparatus according to claim 37, wherein the means for returning filter medium comprises:

a top wall of the inner treatment chamber of the reservoir top, contoured to have a low point disposed above the open top of the tubular member, so that filter medium that may condense on an inner surface of the top wall of the inner treatment chamber will be prompted to collect and drip off from the low point, back into the inner treatment chamber of the reservoir base.

39. The apparatus according to claim 38, wherein the means for returning filter medium comprises:

an aperture in the second tubular portion of the tubular member, for permitting condensed liquid filtering material that may become trapped between the second tubular portion of the tubular member and the wall of the inner treatment chamber of the reservoir top, to flow back into the inner treatment chamber of the reservoir base.

40. The apparatus according to claim 31, wherein the cross-sections of each of the first tubular side wall, the second tubular side wall, the third tubular side wall and the tubular side wall of the tubular member have a common configuration selected from the group of shapes consisting of: cylindrical, rectangular, triangular.

41. The apparatus according to claim 27, wherein the housing comprises:

a substantially hollow reservoir operably configured for receiving and containing a liquid filter medium.

42. The apparatus according to claim 41, wherein the at least one baffle member comprises:

an open-topped tubular member, disposed within the housing, and defining a generally cylindrical inner treatment chamber and a generally annular outer treatment chamber.

43. The apparatus according to claim 42, further comprising:

a fluid separator member, operably disposed between the housing and the at least one baffle member, for partitioning the generally annular outer member into a first annular outer member in direct fluid communication with the inlet to the housing, and a second annular outer member in direct fluid communication with the outlet from the housing.

44. The apparatus according to claim 43, further comprising at least one circumferentially extending baffle wall emanating upwardly from the at least one baffle member toward a top wall of the housing.

45. The apparatus according to claim 43, further comprising at least one circumferentially extending baffle wall emanating downwardly from a top wall of the housing toward the at least one baffle member.

* * * * *

UNITED STATES PATENT AND TRADEMARK OFFICE
CERTIFICATE OF CORRECTION

PATENT NO. : 6,186,128 B1
DATED : February 13, 2001
INVENTOR(S) : Diotte et al.

It is certified that error appears in the above-identified patent and that said Letters Patent is hereby corrected as shown below:

Column 7,
Line 39, delete ";" and insert -- . --

Column 15,
Line 6, delete "seeking" and insert -- seeping --
Line 47, after "may", insert -- be --

Column 16,
Line 6, after "fastener rod", delete "10" and insert -- 110 --

Column 17,
Line 28, after "and", delete "are"
Line 56, delete "100,00" and insert -- 100,000 --

Column 20,
Line 3, delete "reasonable" and insert -- reasonably --

Column 21,
Line 51, delete "carefully" and insert -- careful --

Column 22,
Line 31, start new paragraph at "Some of the advantages..."

Column 24,
Line 11, after "will", insert -- be --

Signed and Sealed this

Eighth Day of October, 2002

*Attest:*

JAMES E. ROGAN
*Director of the United States Patent and Trademark Office*

*Attesting Officer*